US012558874B2

(12) United States Patent
Lee et al.

(10) Patent No.: US 12,558,874 B2
(45) Date of Patent: Feb. 24, 2026

(54) OPTICAL FILTER AND OPTICAL DEVICE UTILIZING SAME

(71) Applicant: Samsung Electronics Co., Ltd., Suwon-si (KR)

(72) Inventors: Kyeong Seok Lee, Seoul (KR); Gyu Weon Hwang, Seoul (KR); Won Mok Kim, Seoul (KR); In Ho Kim, Seoul (KR); Wook Seong Lee, Seoul (KR); Doo Seok Jeong, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1228 days.

(21) Appl. No.: 17/194,833

(22) Filed: Mar. 8, 2021

(65) Prior Publication Data

US 2021/0187907 A1     Jun. 24, 2021

Related U.S. Application Data

(63) Continuation of application No. 16/069,337, filed as application No. PCT/KR2017/008261 on Jul. 31, 2017, now abandoned.

(30) Foreign Application Priority Data

Aug. 22, 2016     (KR) ......................... 10-2016-0106416

(51) Int. Cl.
G02B 5/20          (2006.01)
B32B 15/04        (2006.01)
          (Continued)

(52) U.S. Cl.
CPC ................ B32B 15/04 (2013.01); G02B 1/11 (2013.01); G02B 5/201 (2013.01); G02B 5/28 (2013.01);
          (Continued)

(58) Field of Classification Search
CPC .............. B32B 15/04; B32B 2307/416; B32B 2307/418; B32B 2551/00; G02B 1/11;
          (Continued)

(56) References Cited

U.S. PATENT DOCUMENTS 5,581,094 A     12/1996  Hara et al.
5,726,805 A     3/1998   Kaushik et al.
          (Continued)

FOREIGN PATENT DOCUMENTS

CN          1675571 A     9/2005
CN          1882824 A     12/2006
          (Continued)

OTHER PUBLICATIONS

International Search Report PCT/ISA/210 for International Application No. PCT/KR2017/008261 Dated Dec. 4, 2017.
          (Continued)

*Primary Examiner* — Bumsuk Won
*Assistant Examiner* — John Curtis Sipes
(74) *Attorney, Agent, or Firm* — Harness, Dickey & Pierce, P.L.C.

(57)          ABSTRACT

Provided is an optical filter including first and second reflection layers separated from each other, a dielectric region interposed between the first and second reflection layers and in which two materials of which refractive indexes are different are alternately disposed, and a buffer layer disposed between the dielectric region and at least one of the first and second reflection layers, wherein there are at least two filter regions in which relative volume ratios of the two materials alternately disposed are different.

19 Claims, 30 Drawing Sheets

(51) Int. Cl.
G02B 1/11 (2015.01)
G02B 5/28 (2006.01)

(52) U.S. Cl.
CPC ........ G02B 5/289 (2013.01); B32B 2307/416
(2013.01); B32B 2307/418 (2013.01)

(58) Field of Classification Search
CPC .......... G02B 5/201; G02B 5/28; G02B 5/289;
G02B 5/20
See application file for complete search history.

(56) References Cited

U.S. PATENT DOCUMENTS

| | | | |
|---|---|---|---|
| 5,940,568 A | 8/1999 | Losch | |
| 7,319,560 B2 | 1/2008 | Gunning et al. | |
| 7,667,785 B2 | 2/2010 | Van Gorkom et al. | |
| 8,749,903 B2 | 6/2014 | Yamada et al. | |
| 8,933,389 B2 | 1/2015 | Boutami et al. | |
| 9,261,753 B2 | 2/2016 | Guo et al. | |
| 2002/0159153 A1 | 10/2002 | Nishimura et al. | |
| 2004/0017960 A1 | 1/2004 | Platzman et al. | |
| 2004/0169188 A1 | 9/2004 | Nunoue et al. | |
| 2004/0212306 A1* | 10/2004 | Ahn | H01J 11/38 |
| | | | 313/586 |
| 2006/0165346 A1 | 7/2006 | Sahlgren et al. | |
| 2007/0077349 A1 | 4/2007 | Newman et al. | |
| 2009/0109537 A1 | 4/2009 | Bright et al. | |
| 2009/0257105 A1* | 10/2009 | Xu | G02B 5/003 |
| | | | 359/242 |
| 2010/0220377 A1 | 9/2010 | Yamada et al. | |
| 2011/0290982 A1 | 12/2011 | Boutami et al. | |
| 2013/0077029 A1 | 3/2013 | Nagato et al. | |
| 2014/0061677 A1 | 3/2014 | Jakoby et al. | |
| 2015/0206912 A1 | 7/2015 | Kanamori et al. | |
| 2015/0372440 A1* | 12/2015 | Nakayama | G01J 3/42 |
| | | | 359/615 |
| 2017/0309758 A1 | 10/2017 | Frey et al. | |
| 2018/0145113 A1* | 5/2018 | Sakairi | G09F 9/30 |
| 2019/0006407 A1* | 1/2019 | Uesaka | H01L 27/14627 |

FOREIGN PATENT DOCUMENTS

| | | |
|---|---|---|
| CN | 1969206 A | 5/2007 |
| CN | 101730857 A | 6/2010 |
| CN | 101939669 A | 1/2011 |
| CN | 102262253 A | 11/2011 |
| CN | 103033866 A | 4/2013 |
| CN | 103547948 A | 1/2014 |
| CN | 104854443 A | 8/2015 |
| JP | H10333131 A | 12/1998 |
| JP | 2002268105 A | 9/2002 |
| JP | 2002365601 A | 12/2002 |
| KR | 20060064021 A | 6/2006 |
| KR | 20070035501 A | 3/2007 |
| KR | 20080053478 A | 6/2008 |
| KR | 20100032447 A | 3/2010 |
| KR | 10-2011-0125406 A | 11/2011 |
| KR | 10-2011-0130341 A | 12/2011 |
| KR | 20140031899 A | 3/2014 |
| WO | WO-2015-096901 A1 | 7/2015 |
| WO | WO-2015-169761 A1 | 11/2015 |

OTHER PUBLICATIONS

Written Opinion of the International Searching Authority PCT/ISA/ 237 for International Application No. PCT/KR2017/008261 dated Dec. 4, 2017.
Non-Final Office Action issued Jul. 22, 2020 in U.S. Appl. No. 16/069,337.
Final Office Action issued Dec. 9, 2020 in U.S. Appl. No. 16/069,337.

* cited by examiner

Ag 30nm
Cavity 100nm
Ag 30nm

Single cavity structure

Ag 30nm
Buffer 50nm (n=1.5)
Cavity 100nm
Ag 70nm
Buffer 50nm (n=1.5)
Cavity 100nm
Ag 30nm

FIG. 46

OPTICAL FILTER AND OPTICAL DEVICE UTILIZING SAME

CROSS-REFERENCE TO RELATED APPLICATIONS

This application is a Continuation of U.S. application Ser. No. 16/069,337, filed on Jul. 11, 2018, which is a National phase under 35 U.S.C. § 371 of PCT International Application No. PCT/KR2017/008261 which claims priority under 35 U.S.C. § 119 of Korean Patent Application No. 10-2016-0106416, filed on Aug. 22, 2016, the entire contents of which are hereby incorporated by reference.

BACKGROUND

1. Field

The present invention disclosed herein an optical filter, and particularly to am optical filter for controlling a transmission central wavelength with a relatively simple and small structure and an optical device using the same.

2. Background Art

The linear variable filter (LVF) kind of optical filter having a Fabry-Perot resonator structure, and has a structure of which the thickness of a cavity is linearly variable in the length direction. In the LVF, a lower mirror layer and an upper mirror layer are disposed with the dielectric cavity interposed therebetween.

Such an LVF has a limitation in process reproducibility because of a linear structure in which the thickness varies in the length direction. Also, the resolution of spectrometer using a typical LVF is determined by a height-to-length ratio of the LVF and thus there is difficulty in minimizing a spectrometer element. In particular, due to the linear structure, it is disadvantageous in productivity, resulting from poor process compatibility with a two-dimensional imaging sensor technology.

Since a per-position transmission spectrum of an LVF is formed from an overlap of consecutive spectrums, and integration between the LVF and a photodetector is not monolithic, the LVF is spaced apart from a photodetector array, and due to a stray light effect according thereto, a filter performance is lowered.

In addition, U.S. Pat. No. 5,726,805 discloses a planer optical filter including a dielectric layer. According to the patent, the optical filter includes a reflection layer and a dielectric layer, and the dielectric layer has a period structure formed therein and the period structure is provided with trenches or grooves.

However, according to this scheme, substrates are attached to each other, and thus a manufacturing process is difficult to be understood and may be costly. A central wavelength may not also be easily adjusted.

SUMMARY

The present invention provides an optical filter with a miniaturized structure.

The present invention also provides an optical filter structure capable of increasing productivity by enhancing process reproducibility.

The present invention also provides am optical filter structure for making monolithicity and integration with a photodetector easy, preventing a stray light effect by minimizing a distance between the filter and detector, and enhancing a wavelength variable range and performance such as out-of-band rejection performance.

An embodiment of the present invention is to provide an optical filter including: first and second reflection layers separated from each other; a dielectric region interposed between the first and second reflection layers and in which two materials of which refractive indexes are different are alternately disposed; and a buffer layer disposed between the dielectric region and at least one of the first and second reflection layers, wherein there are at least two filter regions in which relative volume ratios of the two materials alternately disposed are different.

In an embodiment, the two materials may be alternately disposed, and there may be at least two filter regions in which relative width ratios of the two materials are different. A width of a pair of the two materials may be smaller than a wavelength of a light passing through the filter.

In an embodiment, a pair of the two adjacent materials may be allowed to respectively have same widths as a pair of two adjacent other materials in one direction, or the filter regions, in which relative volume ratios of the two materials are different from each other, may be in two or more directions in a plane.

In an embodiment, an intermediate reflection layer parallel to the reflection layers may be further added to a central region of the dielectric region. In this case, an optical filter has a structure provided with two double resonance cavities of an upper structure and a lower structure on the basis of the intermediate reflection layer. In this case, each of the upper structure and lower structure is possible or is not possible to include a buffer layer. Namely, the buffer layer may be further included between the dielectric region and at least one of the first reflection layer, the second reflection layer, and the intermediate reflection layer.

An embodiment of the present invention is to provide an optical device including: first a second reflection layers separated from each other; a dielectric region interposed between the first and second reflection layers and at least two materials, of which refractive indexes are different from each other, are alternately disposed; and a buffer layer disposed between the dielectric region and at least one of the first and second reflection layers, wherein at least two filter regions in which relative volume ratios of the two materials alternately disposed are different from each other, and photodetectors are respectively provided in correspondence to the filter regions. The optical device may be a spectroscope, a CMOS image sensor, or a hyper-spectra imaging device.

An embodiment of present invention is to provide an optical device including: a transmissive substrate; and the optical filter of the foregoing provided on an upper part of the transmission substrate and integrated in a separate module type.

An optical filter structure of the present invention may be miniaturized by including a dielectric region for allowing at least two regions where relative volume ratios of two materials are different to be present.

In addition, the optical filter structure of the present invention may increase productivity by improving process reproducibility.

On the other hand, the optical filter structure of the present invention allows monolithicity and integration with a photodetector to be easy by including first and second reflection plates parallel to each other and a dielectric region interposed therebetween and including two materials, and minimizing a distance between a filter and a detector array to prevent a stray light effect and enhance performance.

BRIEF DESCRIPTION OF THE DRAWINGS

FIG. 46 is a conceptual diagram of a filter array including a hyper spectral image sensor according to an embodiment of the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present invention, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

Figure 1:
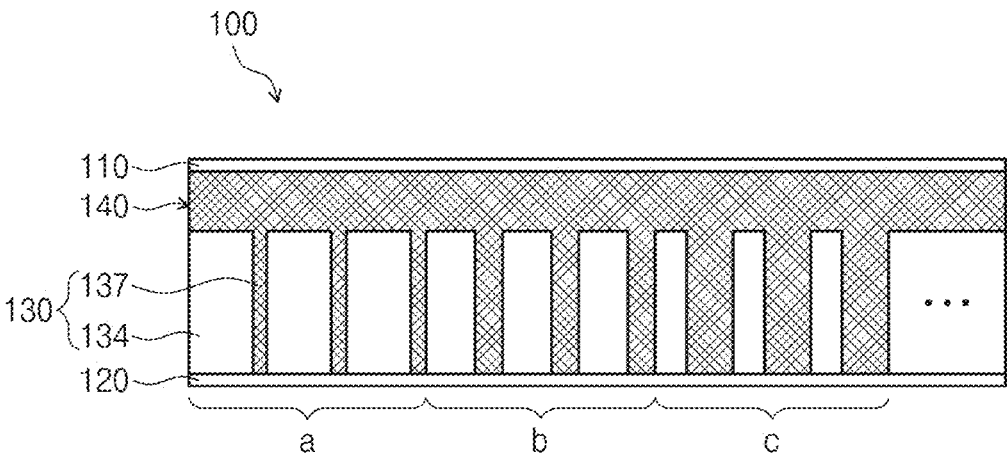
FIG. 1 is a longitude-sectional view of an optical filter according to an embodiment of the present invention.
Figure 2:
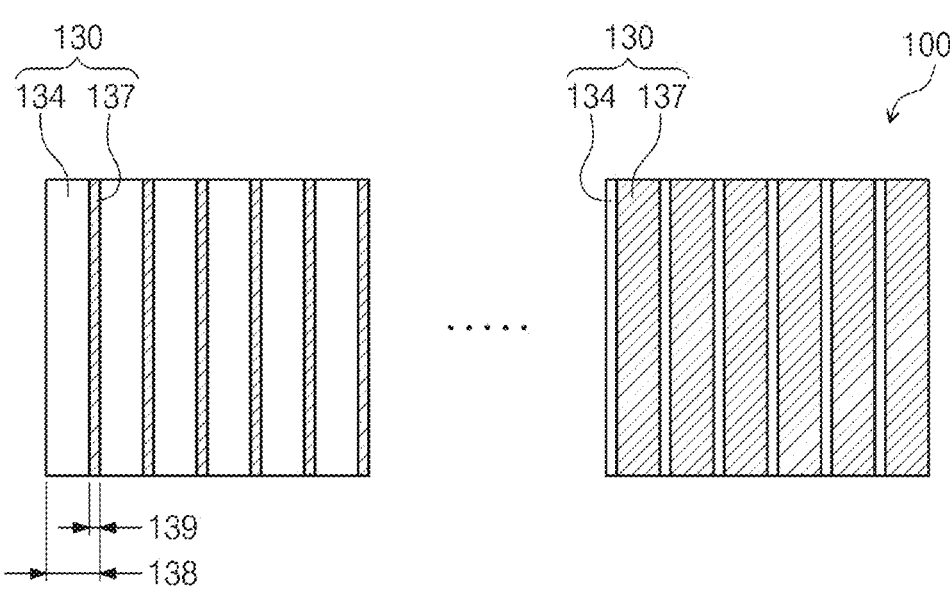
FIG. 2 is a plan view of the dielectric region of FIG. 1.

FIG. 1 is a longitude-sectional view of one dimensional optical filter according to an embodiment of the present invention, and FIG. 2 is a plan view of a dielectric region of FIG. 1.

Referring to FIGS. 1 and 2, a description will be provided about a structure of an optical filter 100 according to an embodiment of the present invention.

The optical filter 100 of the present invention includes first and second reflection layers 110 and 120, a dielectric layer 130 and a buffer layer 140. The first and second reflection layers 110 and 120 may form both side surfaces of the optical filter 100. For example, the first and second reflection layers 110 and 120 may be disposed in one-dimensional type so as to be disposed parallel to one direction, and possibly form a two-dimensional optical filter 100.

The buffer layer 140 is disposed between the dielectric layer 130 and at least one of the first and second reflection layers 110 and 120. In other words, the buffer layer 140 is disposed on at least one of an upper side and a lower side of the dielectric region 130, and the dielectric region 130 and the buffer layer 140 are interposed between the first and second reflection layers 110 and 120.

The buffer layer 140 together with the dielectric region 130 operates as an optical resonance cavity. The presence of the buffer layer 140 increases the effective thickness of the optical resonance cavity, and thus a central wavelength of a transmission band of the optical filter 100 is moved to a long wavelength region while the thickness of the dielectric region layer 130 is maintained small. When the optical resonance cavity is configured only from the dielectric region layer 130, an aspect ratio is excessively increased to compensate for any one material in the dielectric region layer 130 that is composed of a combination of two materials that have different refractive indexes and a sufficiently smaller period than an operation wavelength, which results difficulty on process. Accordingly, the presence of the buffer layer 140 is advantageous in that the thickness of the dielectric region layer 130 is maintained small and a wave-length variable range is effectively increased.

The first and second reflection layers 110 and 120 may be respectively a metal thin film having semi-transmission property and a distributed Bragg reflector (DBR) formed of a periodic multilayer structure of a high refractive index dielectric region layer and a low refractive index dielectric region thin layer.

Here, the dielectric region 130 and the buffer layer 140 will be described.

The dielectric region 130 is disposed between the first and second reflection layers 110 and 120, and at least two materials 134 and 137 with different refractive indexes are disposed. There are at least two regions in which relative volume ratios of the two materials 134 and 137 forming the dielectric region 130 are different.

The two materials 134 and 137 forming the dielectric region 130 may be alternately disposed. On the other hand, the dielectric region 130 may be formed along one direction such that there are at least two regions in which relative width ratios of the two materials 134 and 137 are different. Such a structure becomes one-dimensional optical filter structure (see FIG. 2).

Referring to FIG. 1, a region in which a central wave-length of a transmission light varies is illustrated as three regions of a, b, and c. In this case, the two different materials 134 and 137 are alternately disposed in the three regions of a, b, and c, at an identical period, and the relative width ratios of the two materials 134 and 137 are different. Due to such a structure, the three regions of a, b, and c have different light transmission wavelengths between the first and second reflection layers 110 and 120.

In detail, one direction of FIG. 2 means a horizontal direction to which the length direction of the dielectric region 130 is extended laterally. At least two materials 134 and 137 of which refractive indexes in the dielectric region 130 are disposed in the one direction.

On the other hand, the dielectric region 130 may be formed such that there are at least two regions in which relative volume ratios of the two materials 134 and 137 are different. For example, in a certain region, two materials may be alternately disposed in a pre-determined width, and in another certain region, the two materials may be alter-nately disposed in a differently pre-determined width. Even when the two materials have different widths in different regions, widths of the two adjacent materials in an identical filter that transmits an identical wavelength is made con-stant. Accordingly, a to c regions are shown, and in each region, relative volume ratios of the two materials 134 and 137 are constant. As exemplarily shown in the drawing, the relative volume ratios of the two materials 134 and 137 are different in adjacent regions and widths of the adjacent to materials 134 and 137 are constant in all three regions a to c.

The two materials 134 and 137 of the dielectric region 130 may be named as, for example, first and second materials 134 and 137. The first and second materials 134 and 137 may be dielectrics having different refractive indexes. In addition, the first material 134 may be a dielectric material with a relatively low refractive index and the second mate-rial 137 may be a dielectric material with a relatively high refractive index, but the present invention is not limited thereto. In other words, the first material 134 may be a material of a relatively high refractive index, and the second material 137 may be a material of a relatively low refractive index. The dielectric of the low refractive index may be, for example, a fluorine ultraviolet ray resin, a spin on glass, hydrogen silsesquioxane (HSQ), magnesium fluoride ($MgF_2$), calcium fluoride ($CaF_2$), or silicon oxide ($SiO_2$). The dielectric of high refractive index may be, for example, a metal-oxide such as titanium oxide ($TiO_2$).

In other words, the dielectric region 130 of the present invention may be a binary dielectric region 130 that is a kind of an effective medium of a combination of two dielectric regions 130 having different refractive indexes, and a rela-tive ratio of the first and second materials 134 and 137 may become gradually different in one direction.

Relative ratios between the first and second materials 134 and 137 of the present invention may be defined as a duty cycle or a fill factor. The duty cycle of fill factor in the present invention is a relative volume ratio that a component of the first material 134 between the first and second materials 134 and 137 occupies on the basis of the first material 134. The refractive index of the dielectric region 130 is made variable in one direction by gradually changing a mutual duty cycle or fill factor between the first and second materials 134 and 137 in the dielectric region 130.

A wavelength of a light passing the optical filter 100 is controlled by the optical thickness of the dielectric region. The optical thickness may be defined as a value of physical thickness multiplied by a refractive index, and a determinant of a transmission band wavelength of the filter of the present invention is the optical thickness of the dielectric region. Therefore, a central wavelength may also be controlled by a refractive index change besides the physical thickness.

On the other hand, a width of a pair of the first and second materials 134 and 137 has a relation with a wavelength of a filter to be transmitted. For example, the width of the pair of the first and second materials 134 and 137 may be made sufficiently small, and in this case, a light does not discrimi-nate the two materials as individual materials and recognizes the same as one effective medium defined by a specific effective dielectric constant. At this point, an optical con-stant of the effective medium is determined by a geometrical distribution of the two materials and a relative volume fraction. For the dielectric region 130 of which an imaginary part of the dielectric constant is close to 0, the optical constant of the effective medium has an arbitrary value between optical constants of the two components.

FIG. 1 illustrates an example in which the buffer layer 140 is disposed on an upper part of the dielectric region 130. However, the present invention is not limited thereto, and the buffer layer 140 may be disposed in any one of the upper part and lower part. An operation wavelength control ability of the filter 100 is enlarged by the buffer layer 140. The buffer layer 140 may be, for example, a dielectric spacer.

According to a preferred embodiment, the buffer layer 140 may be the first material 134 or the second material 137. For example, when the buffer layer 140 is the second material 137, it is advantageous in manufacturing process. For example, first, in a situation where the first material is patterned, the second material 137 is spread on the entire patterned region of the first material 134 to fill a gap of the first material 134. For example, when a resin is used as the second material 137, the gap of the first material 134 is filled with the resin by spin coating, and the resin may also be spread widely on the top surface of the second material 137. In this case, a planarization work may be separately per-formed.

Figure 4:
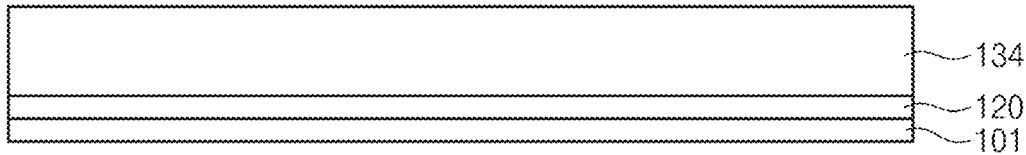
Figure 7:
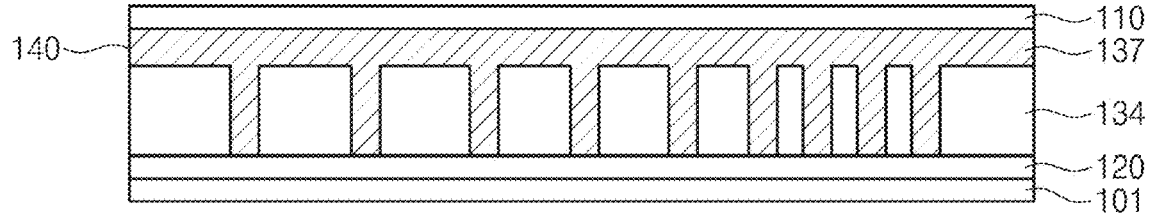

FIGS. 4 and 7 illustrate process charts illustrating a method of manufacturing an optical filter according to an embodiment of the present invention.

Referring to FIG. 4, a first reflection layer 120 is formed on a substrate 101. As described above, the first reflection layer 120 may be formed of a thin film of such as Ag, Au, Al, Cr, or Mo, which has semi-transmission property, or a DBR formed of periodic multilayer structure of a high refractive index dielectric region layer and a low refractive index dielectric region layer. As the substrate 101, a transmissive substrate may be adopted, and the transmissive substrate may be a glass or a polymer. For example, a transmissive film may be configured from a transparent or a semi-transparent polymer having an appropriate adhesive power or impact absorption. A specific example may be non-restrictively Polystyrene (PS), Expandable Polystyrene (EPS), Polyvinyl Chloride (PVC), Styrene Acrylonitrile Copolymer (SAN), Polyurethane (PU), Polyamide (PA), Polycarbonate (PC), Modified Polycarbonate, Polyvinyl butyral, Polyvinyl acetate, Acrylic Resin, Epoxy Resin (ER), Silicone Resin, Unsaturated Polyester (UP), polyimide, polyethylene naphtalate, or polyethylene terephtalate, etc., and these may be used individually or by mixing two or more.

Figure 3:
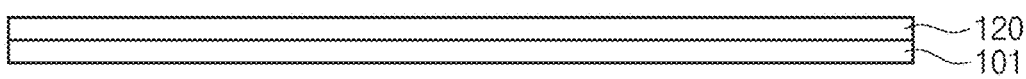
FIGS. 3 and 7 illustrate process charts illustrating a method of manufacturing an optical filter according to an embodiment of the present invention.
Figure 5:
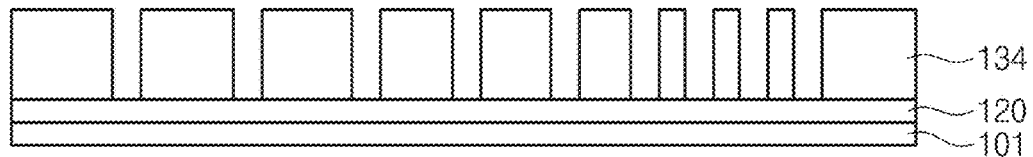

Referring to FIGS. 4 and 5, the first material 134 is deposited on the top surface of the first reflection layer 120 and then patterned. Such works may be performed by a photolithography, e-beam lithography, or nanoimprint lithography process. When the photolithograpy process is adopted, as FIG. 3B, the first material 134 is entirely deposited, a photosensitive photoresist is deposited thereon, and the photosensitive photoresist is selectively opened by a light. Then, the first material 134 is patterned by an etching process. When the nanoimprint process is adopted, after the first material 134 is deposited, a resin layer is spread thereon and a pattern is imprinted using an imprint device, and then an etching process is conducted to pattern the first material 134. On the other hand, without directly conducting the etching process for the first material, it is also possible that a first material layer is deposited on a pre-patterned photoresist or resin layer and then the first material is patterned through a lift-off process.

Figure 6:
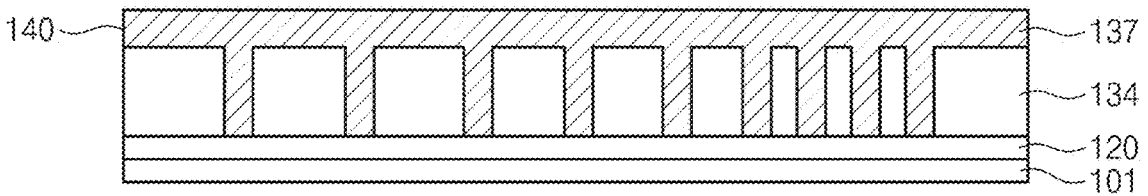

Referring to FIG. 6, the second material 137 is formed on the entire surface including a patterned first material 134 and the first reflection layer 120. The second material may be formed by spin coating or vapor deposition.

After forming the second material 137, in order to make the formation of the second reflection layer 110 easy or enhance the property of an optical filter, a process of planarizing the top surface of the second material 137 may be further included.

Referring to FIG. 7, the optical filter is completed by forming the second reflection layer 110 on the entire structure in which the second material 137 is formed. Like the first reflection layer 120, the second reflection layer 110 may also be formed of a thin film of such as Ag, Au, Al, Cr, or Mo, which has semi-transmission property, or a DBR formed of a periodic multilayer structure including high refractive index dielectric regions and low refractive index dielectric regions.

Figure 8:
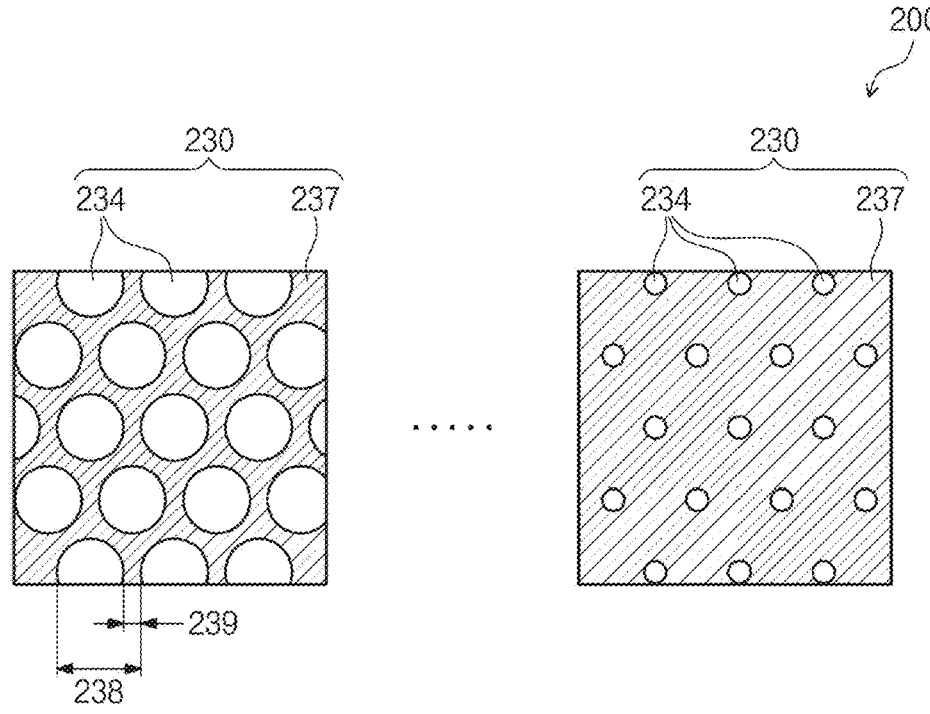
FIGS. 8 and 9 are plan views of a dielectric region of a two-dimensional optical filter according to an embodiment of the present invention.
Figure 9:
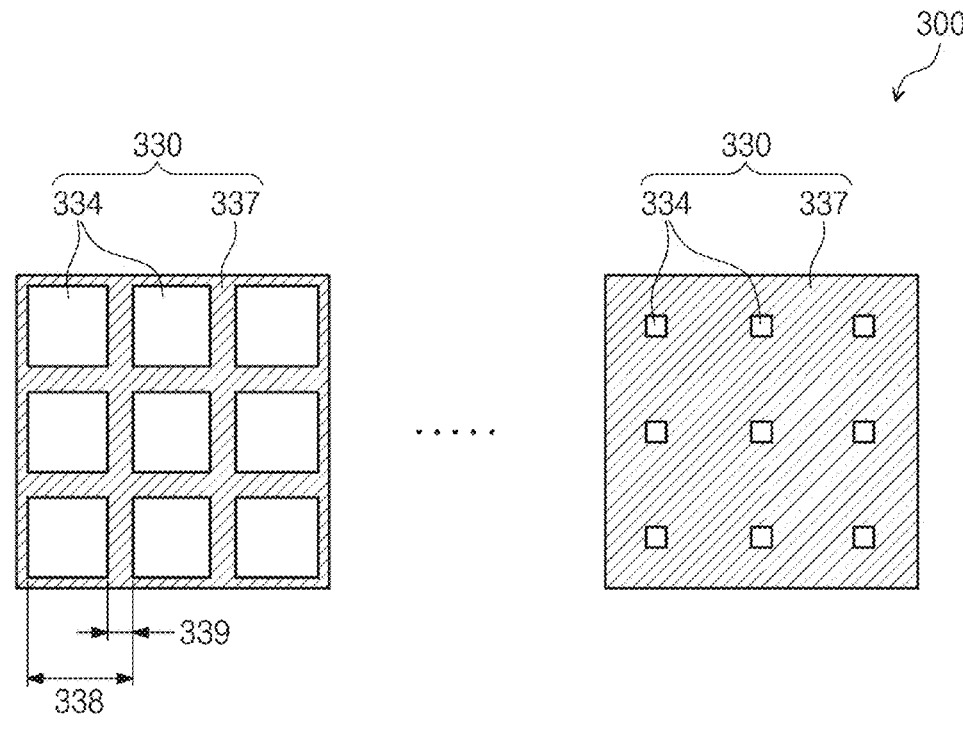

FIGS. 8 and 9 are plan views of a dielectric region of a two-dimensional optical filter according to an embodiment of the present invention.

For convenience of explanation, a difference with FIG. 1 will be mainly described. The optical filter structure of FIG. 1 is configured to have at least two spots in which relative width ratios of the two materials 134 and 137 are different along one direction, in a state where the two materials 134 and 137 forming the dielectric region 130 are alternately disposed. In comparison, the two-dimensional optical filters of FIGS. 8 and 9 have a structure in which two materials 234 and 237; 334 and 337 forming the dielectric regions 230 and 330 vary in two-dimensional directions. FIG. 8 shows that the first material 234 between the two materials 234 and 237 has a circular shape and the second material 237 has a shape that surrounds the circular shape. FIG. 9 shows that the first material 334 between the two materials 334 and 337 has a rectangular shape and the second material 337 has a shape that surrounds the rectangular shape.

For the optical filters of FIGS. 8 and 9, a wavelength control for forming a variable filter is achieved by forming at least two spots in which relative volume ratios of the two materials, which are alternately disposed, are different. FIGS. 8 and 9 exemplarily show that the first materials have respectively the circular and rectangular shapes, but the shape may also be circular, rectangular, hexagonal, or octagonal. In other words, if provided only at least two spots in which the relative volume ratios between the first and second materials 234 and 237 are different, the shape is not particularly limited and various shapes may be available. Additionally, various shapes such as a cross shape and a polygonal shape is adoptable.

On the other hand, a planar disposal of the first material is performed in a periodic lattice structure, and various lattice structures may be available besides a hexagonal lattice shown in FIG. 8 or a rectangular lattice shown in FIG. 9.

Figure 10:
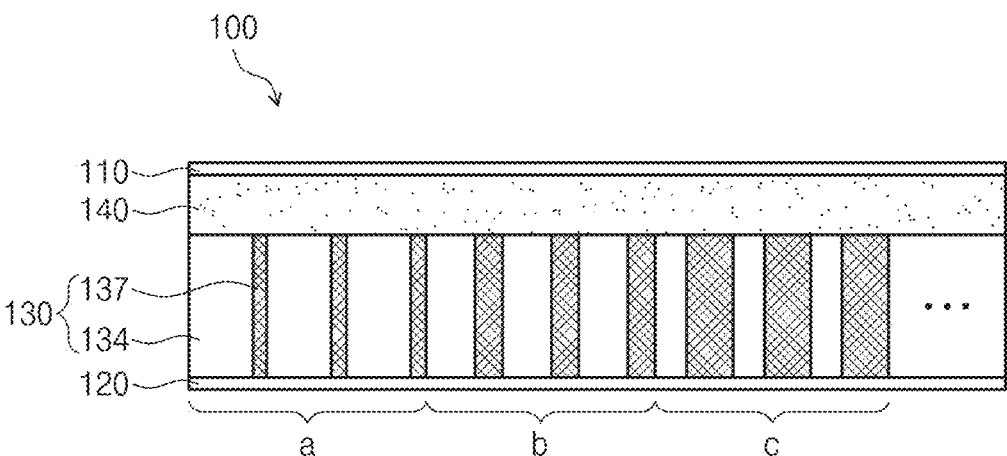
FIG. 10 illustrates cross-sectional views of other optical filters according to an embodiment of the present invention.

FIG. 10 illustrates a cross-sectional view of other optical filters according to an embodiment of the present invention.

For convenience of explanation, a difference with FIG. 1 will be mainly described. FIG. 1 shows a case where the buffer layer 140 formed on the top surface of the dielectric region 130 is formed of the same material as the first or second material, but FIG. 10 shows a case where the buffer layer 140 adopts a different material from the first or second material. An operation wavelength control ability of the filter 100 is enlarged by the buffer layer 140. The buffer layer 140 may be, for example, a dielectric spacer.

On the other hand, FIG. 10 illustrates that the buffer layer 140 is formed of a completely different material from the first or second material, but in actual implementation, a portion of the first or second material remains as a buffer layer and a different material from the first or second material may form the buffer layer 140 thereon. According to the configuration of FIG. 10, there is a large variety of selecting the buffer layer 140.

Figure 11:
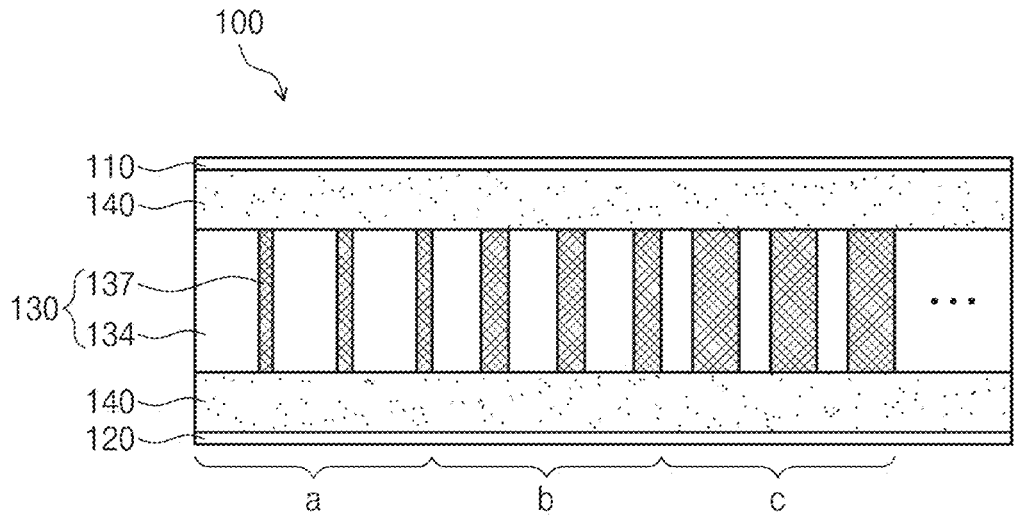
FIG. 11 illustrates cross-sectional views of other optical filters according to an embodiment of the present invention.

FIG. 11 illustrates cross-sectional views of other optical filters according to an embodiment of the present invention.

For convenience of explanation, a difference with FIG. 10 will be mainly described. FIG. 6 shows a case where the buffer layer 140 formed on the upper part of the dielectric region 130 exists, but FIG. 11 shows a case where the buffer layer 140 exists on a lower part of the dielectric region 130 as well as the upper part. The buffer layer existing on the upper part and the buffer layer existing on the lower part may be formed of the same material or different materials. In addition, each of the buffer layers existing on the upper part and the lower part may be formed of the same material as or a different material from the first or second material. When the buffer layers 140 exist on the upper and lower parts, the operation wavelength control ability is enlarged.

Figure 12:
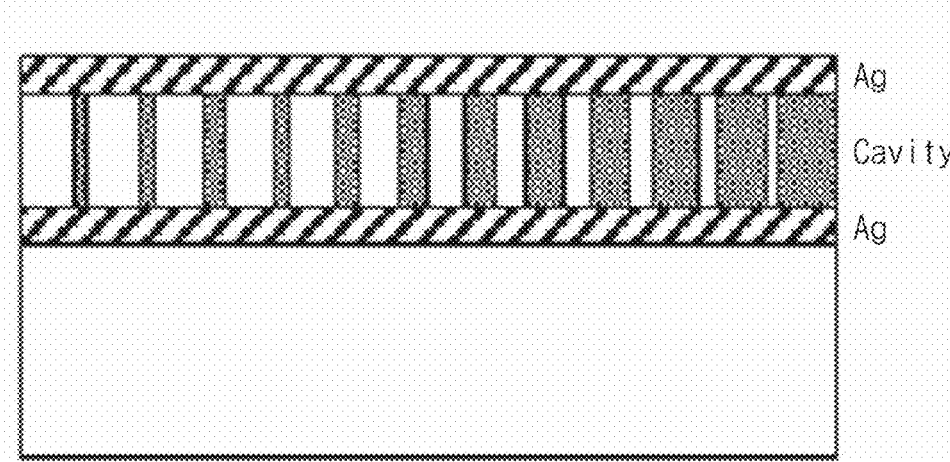
FIGS. 12 to 19 illustrate simulation results of an optical filter of one-dimensional structure.
Figure 13:
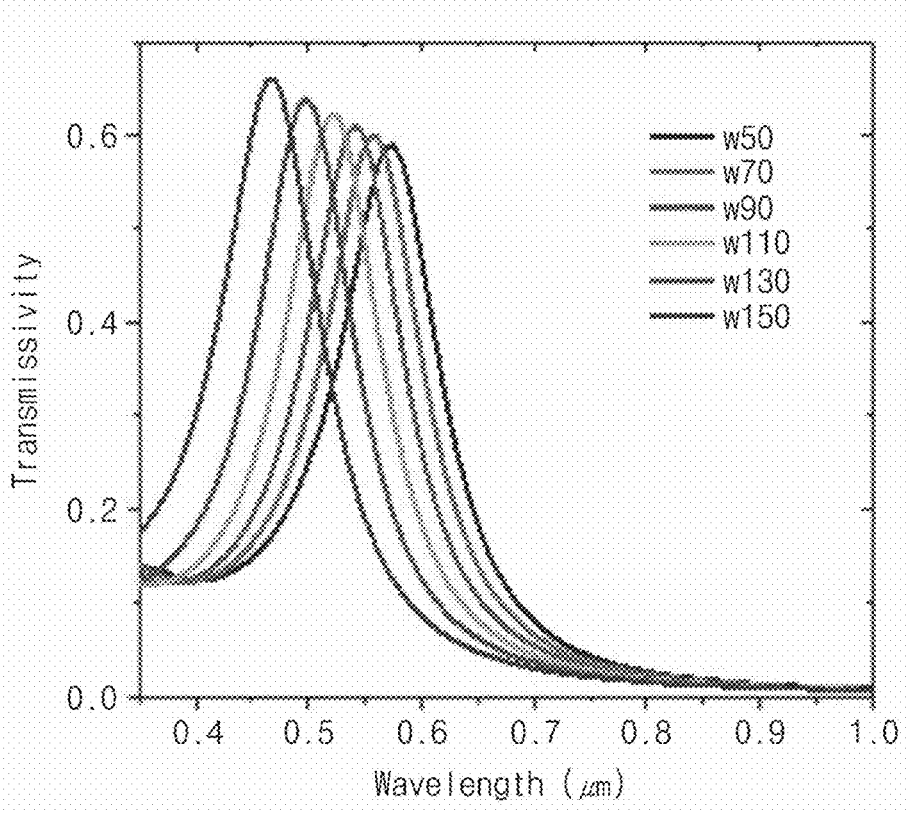

Hereinafter, graphs showing results of simulating an operation of each filter will be described. FIGS. 12 to 19 illustrate simulation results of an optical filter of one-dimensional structure, and FIGS. 12 and 13 illustrate optical filter structures of which a planar structure is two-dimensional.

Figures 14, 15:
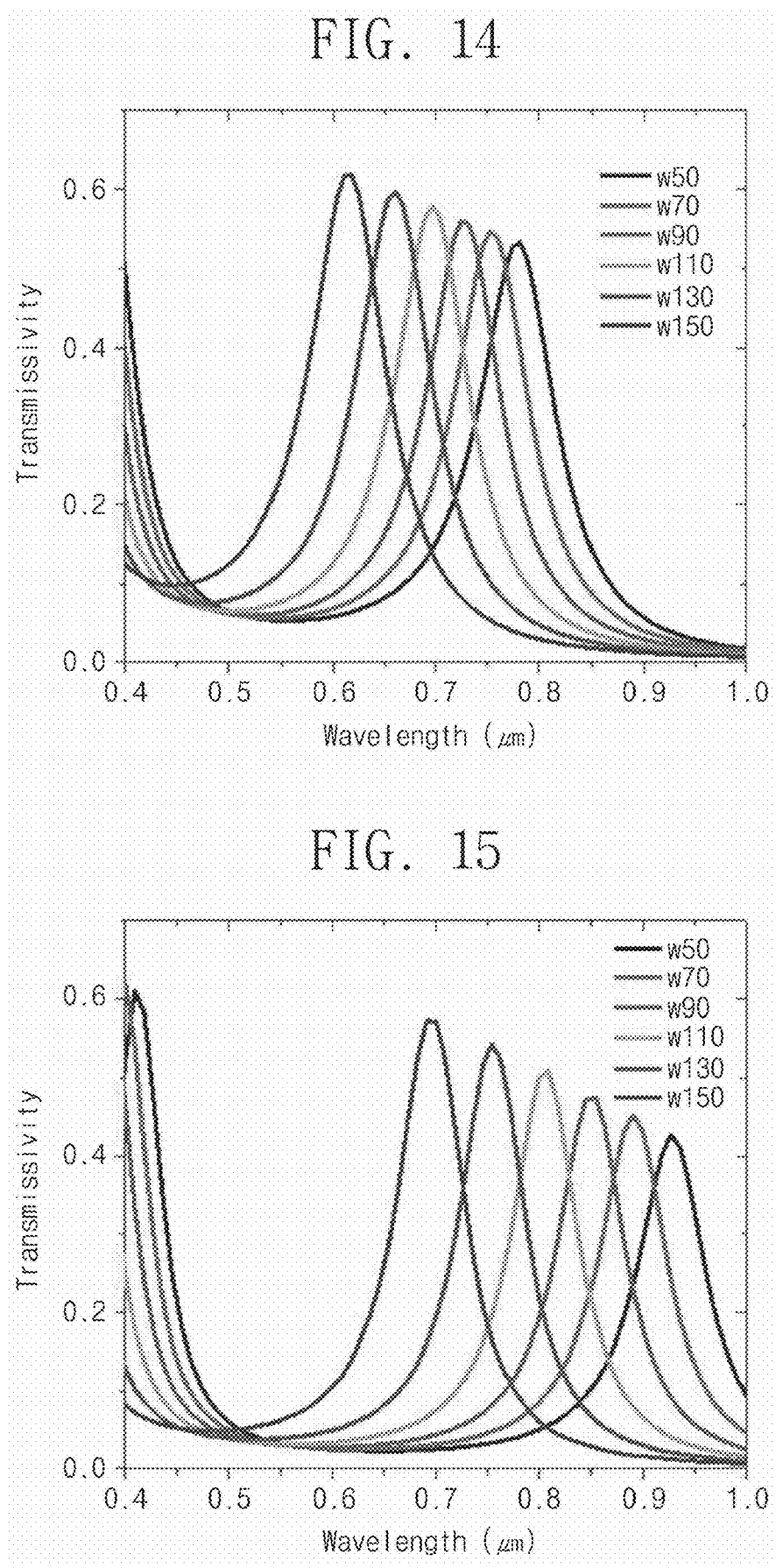

FIG. 12 illustrates a structure of an optical filter on which the present simulation is performed, and graphs of FIGS. 13 to 15 show transmission band simulation results calculated for a linear lattice structure in order to show a filter operation of the present invention.

The results are calculated under assumption that a lattice period is 200 nm, and the thickness of the dielectric region layer is 60 nm in FIG. 13, 100 nm in FIG. 14, and 150 nm in FIG. 15. It is also assumed that a refractive index of a low refractive index material between the two materials is 1.38 and a high refractive index material is 2.7. As the upper and lower reflection layers, 20 nm thick Ag layers having a semi-transmission property are adopted. It may be known that as the thickness of the dielectric region layer increases, an entire wavelength band with a transmission band formed therein moves toward a long wavelength region.

The calculation results show a variation aspect of the transmission band in a state where the period is fixed to 200 nm and the width of a low refractive index nanostructure is increased from 50 nm to 150 nm at an interval of 20 nm. It may be known that as a fill factor of the high refractive index nanostructure increases, a central wavelength of the transmission band moves toward a long wavelength region.

Since the calculation is conducted by using a metal mirror layer having a semi-transmission property, a full width at half maximum (FWHM) of the transmission band is wide and a transmissivity shows also a certain limit or lower. But when a DBR is alternatively adopted, a very narrow FWHM and high transmissivity may be achieved identically to a typical linear variable filter technology in which the thickness varies in a length direction.

Figures 16, 17:
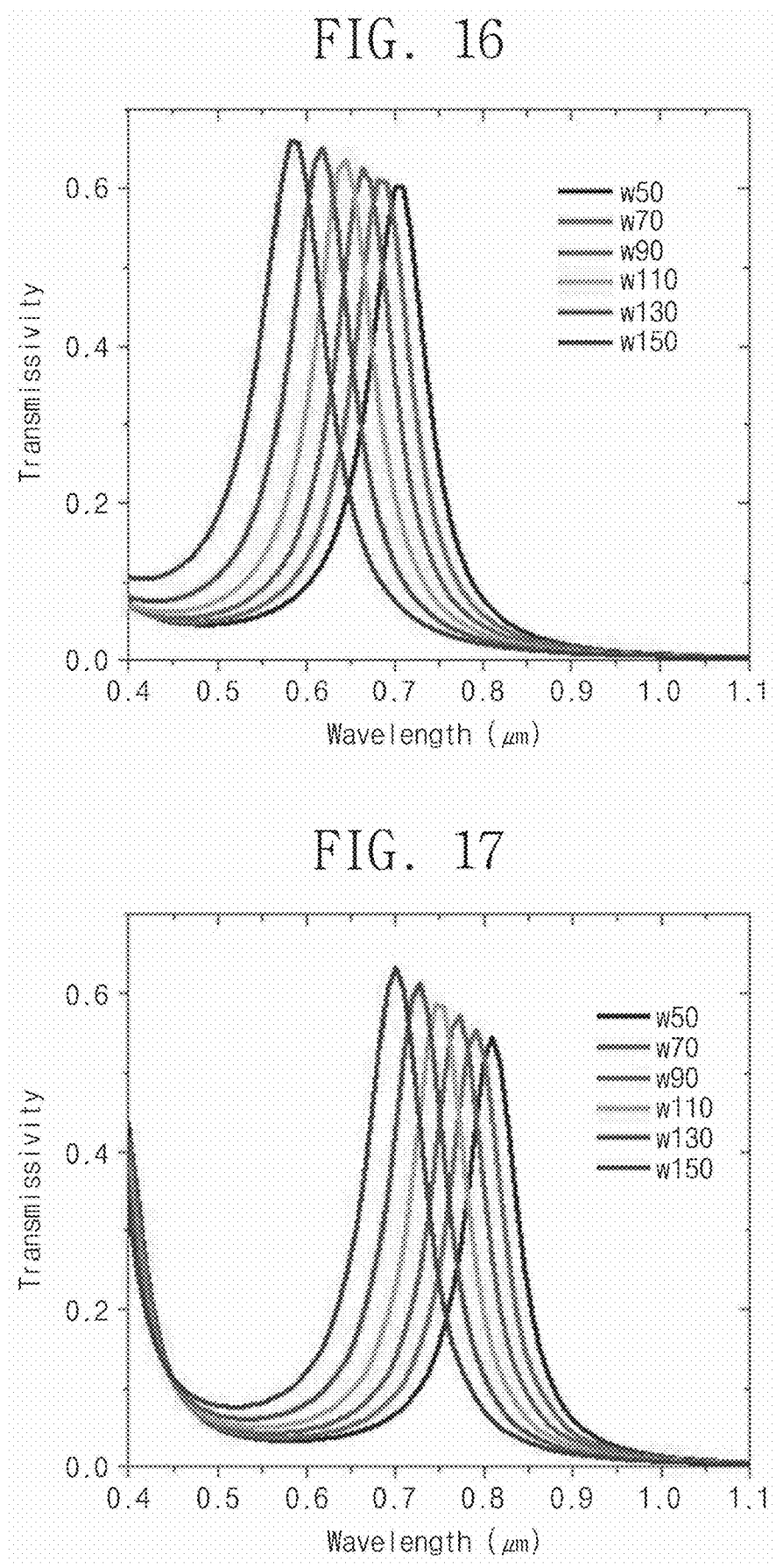

Next, FIGS. 16 and 17 are simulation results for a structure in which a lower buffer layer is inserted to a basic structure of FIG. 12. FIG. 16 shows transmission band curves, when calculation is conducted in a state where a buffer layer having a refractive index of 1.38 and thickness of 50 nm is inserted to a lower part of the dielectric region layer in the structure of FIG. 12 of which the thickness of the dielectric region layer is 60 nm. FIG. 17 shows a variation in transmission band curve, when only the thickness of a lower buffer layer is increased to 100 nm under the condition of FIG. 18. It may be known that as the buffer layer is inserted, the transmission band entirely moves toward a long wavelength region and a movement degree is proportional to the thickness of the buffer layer.

Figure 18:
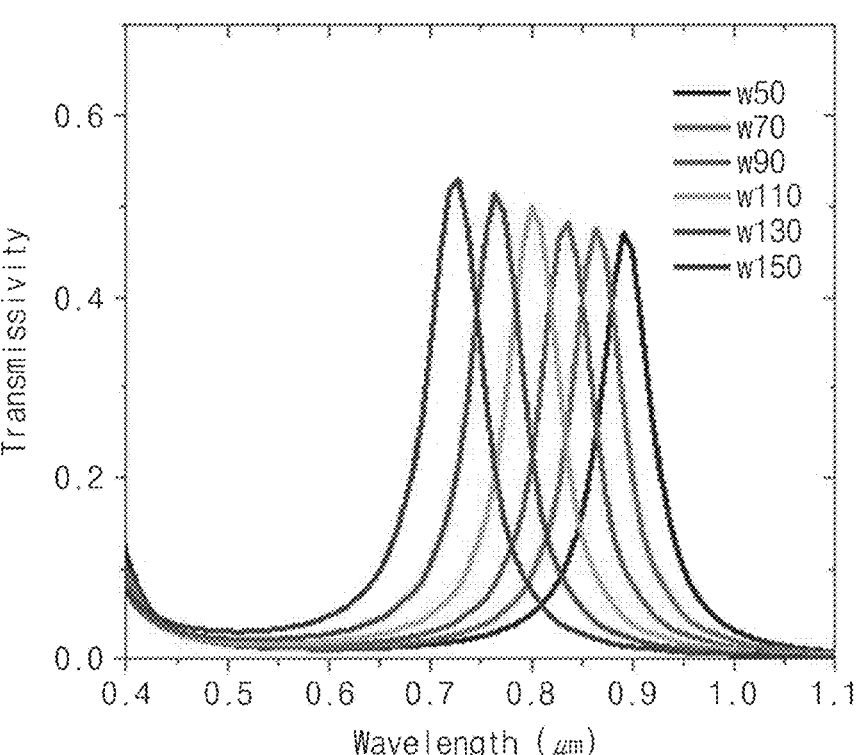

FIG. 18 shows a simulation result for a structure in which upper and lower buffer layers are inserted to a basic structure of FIG. 12. FIG. 18 shows a transmission band spectrum, when buffers having a refractive index of 1.38 and the thickness of 50 nm are respectively applied to the structure of FIG. 12. It may be known that the central wavelength of the transmission band moves further to the long wavelength region by a symmetric insertion of the upper and lower buffer layers in comparison to the case of FIG. 17 where only the lower buffer layer is increased to 10 nm, and there is an effect of improving a out-of-band rejection property.

Figure 19:
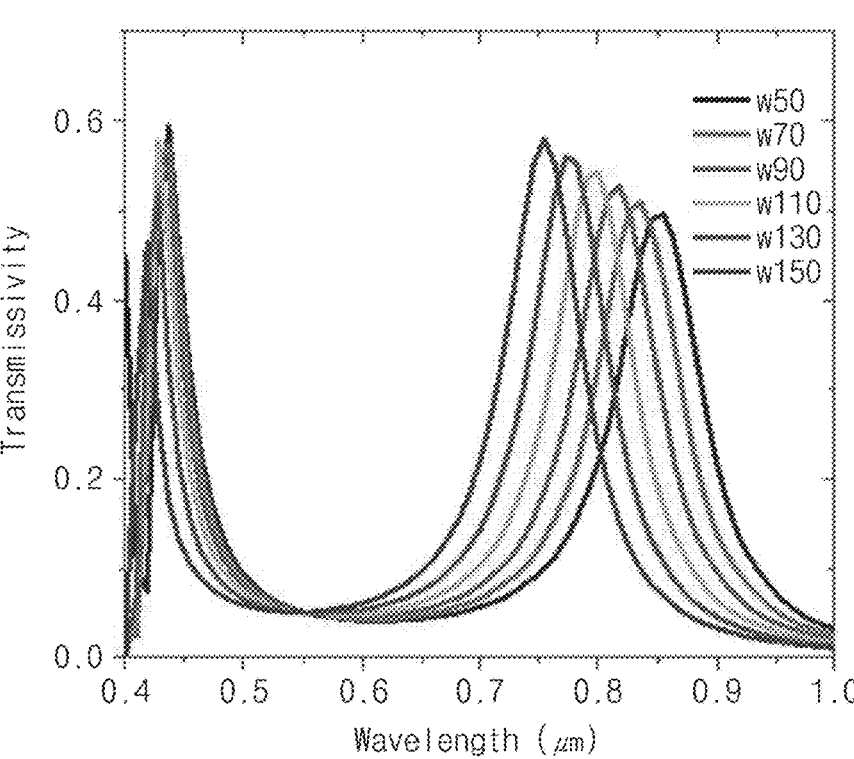

FIG. 19 shows a simulation result for a structure in which an upper buffer layer is inserted to a basic structure of FIG. 12. FIG. 19 shows a transmission band spectrum, when a buffer having a refractive index of 2.7 and the thickness of 50 nm is applied to the upper part of the dielectric region in the structure of FIG. 12. Red-shift of the entire transmission band occurs even by the insertion of the upper buffer layer.

Figure 20:
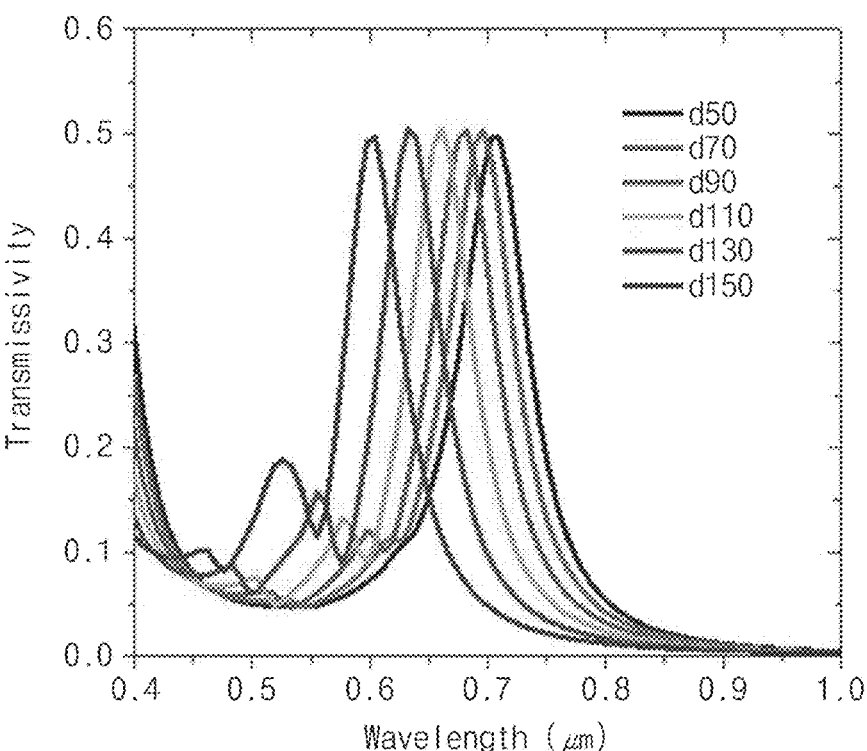
FIGS. 20 to 23 illustrate optical filer structures of which a planar structure is two-dimensional.
Figure 21:
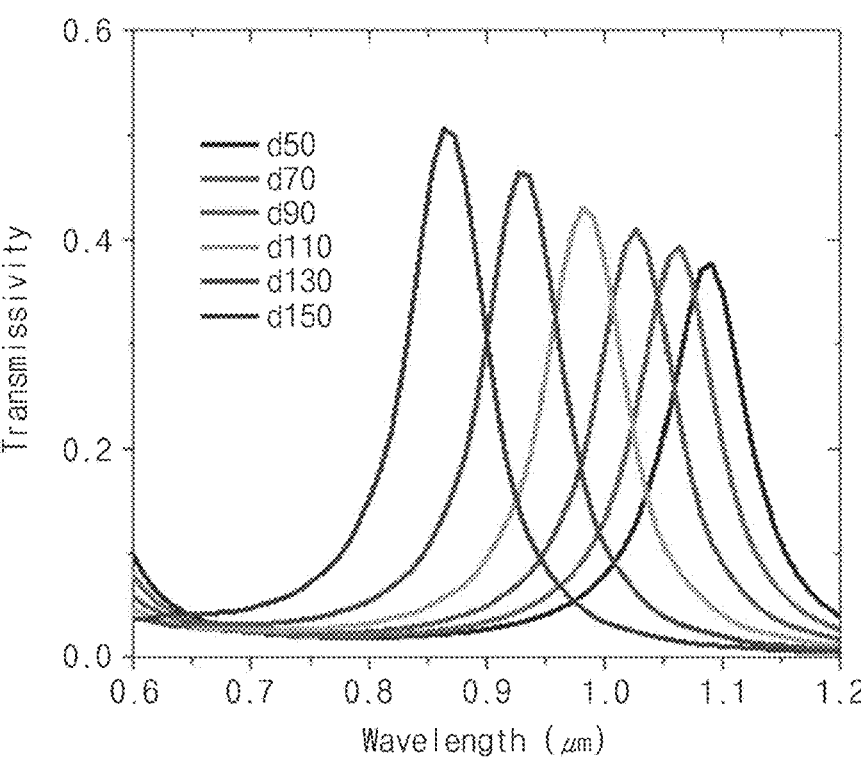
Figure 22:
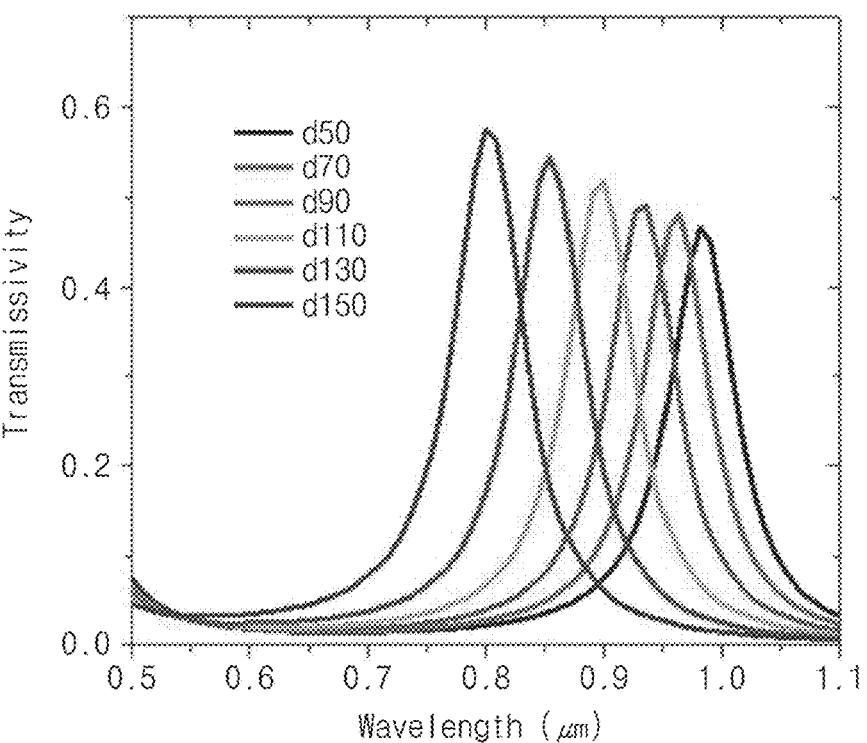

FIGS. 20 and 22 illustrate optical device structures of which a planar structure is two-dimensional. First, FIG. 20 shows a calculation result for a filter structure in which a low refractive index nanostructure forms a hexagonal lattice structure and a high refractive index material encloses the surrounding. Here, FIG. 20 shows a transmission band variation aspect, when the diameter of the low refractive index nanostructure, which is in a spherical pillar type, is increased from 50 nm to 150 nm in a state where the thickness of the dielectric region 130 is 100 nm and the period of the hexagonal lattice structure is fixed to 200 nm. FIG. 21 shows a spectrum when only the thickness of the dielectric region is increased to 150 nm in the structure of FIG. 20. Similar to one-dimensional structure, it may be known that as the volume fraction of the high refractive index material increases among materials forming the dielectric region layer, the transmission band is red-shifted and a control range thereof is easily enlarged by insertion of the buffer layer.

Figure 23:
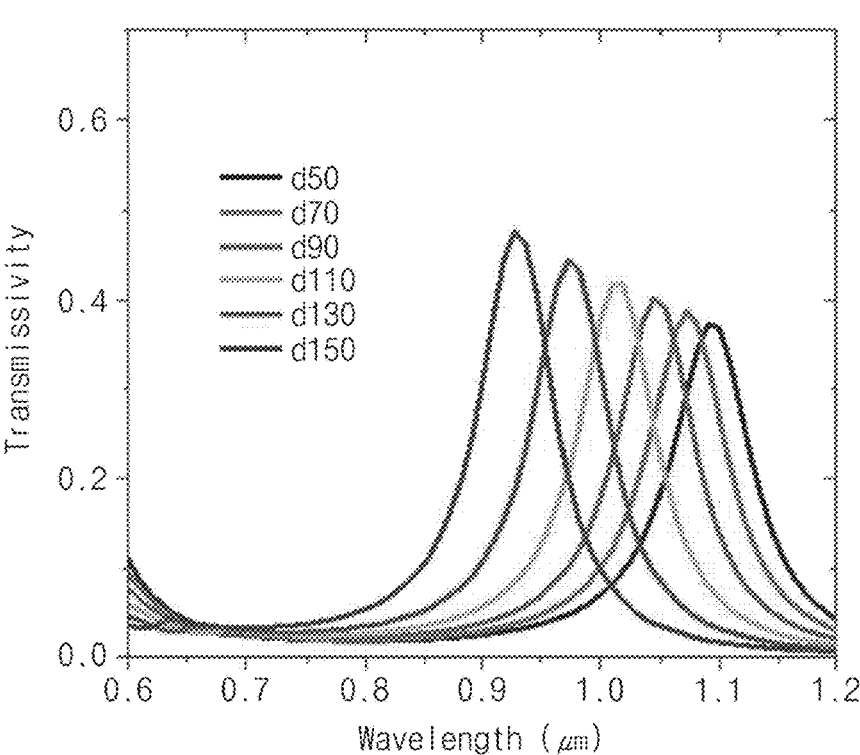

FIG. 22 shows a transmission band spectrum when a dielectric layer of which a refractive index is 1.38 and the thickness of 50 nm is inserted as the lower buffer layer in the structure of FIG. 20. Also, FIG. 23 shows a calculation result when a dielectric layer of which a refractive index is 2.7 and the thickness of 50 nm is inserted as the upper buffer layer in the filter structure of FIG. 20.

Figure 24:
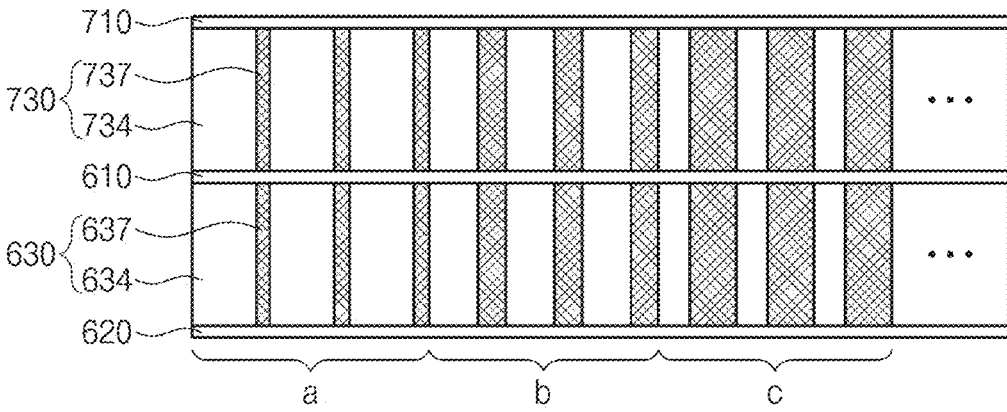
FIG. 24 illustrates cross-sectional views of other optical filters according to an embodiment of the present invention.

FIG. 24 illustrates a cross-sectional view of other optical filters according to an embodiment of the present invention.

Referring to FIG. 24, an optical filter of FIG. 24 has a structure in which a separate reflection layer is additionally inserted between dielectric regions. Through this, the optical filter of FIG. 12 includes a lower structure including reflection layers and a dielectric region therebetween, and an upper structure including reflection layers and a dielectric region. In other words, the optical filter of FIG. 12 has a double resonance cavity structure or an induced transmittance filter structure. Since each layer is identical to the above-described configurations, a description thereabout will be omitted so as to avoid repetition. For example, each reflection layer is possibly formed of a DBR. The optical filter of the present invention has a structure including first and second reflection layers 710 and 620, dielectric regions 730 and 630, and a separate intermediate reflection layer 610 inserted thereto. a, b, and c denote filter regions.

Figure 25:
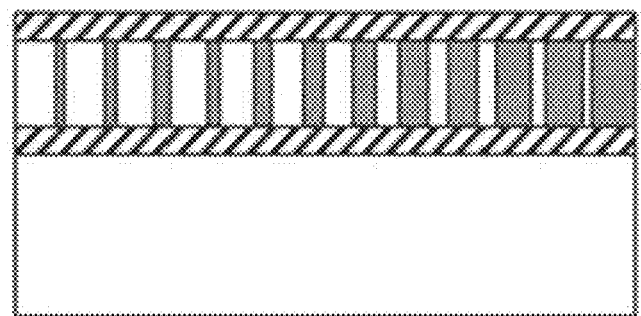
FIGS. 25 and 26 are simulation documents for comparing a single resonance cavity structure with a double resonance cavity structure of the present invention, and FIG. 27 are simulation documents for comparing double resonance cavity structures including a dispersion Bragg reflector (DBR)
Figure 25:
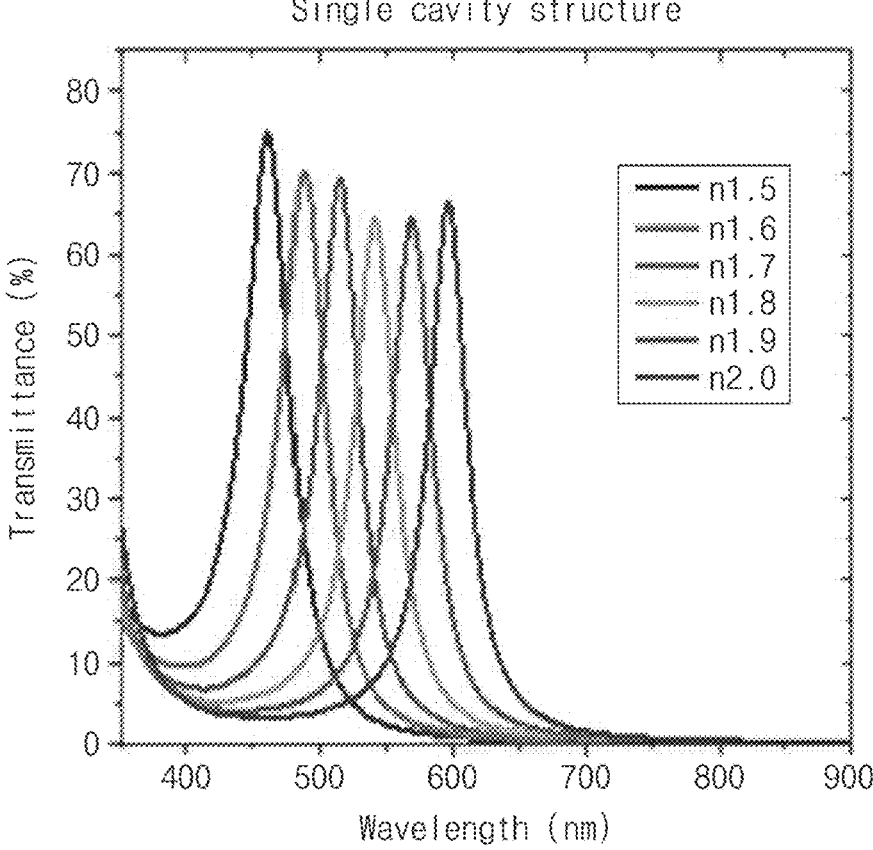
Figure 26:
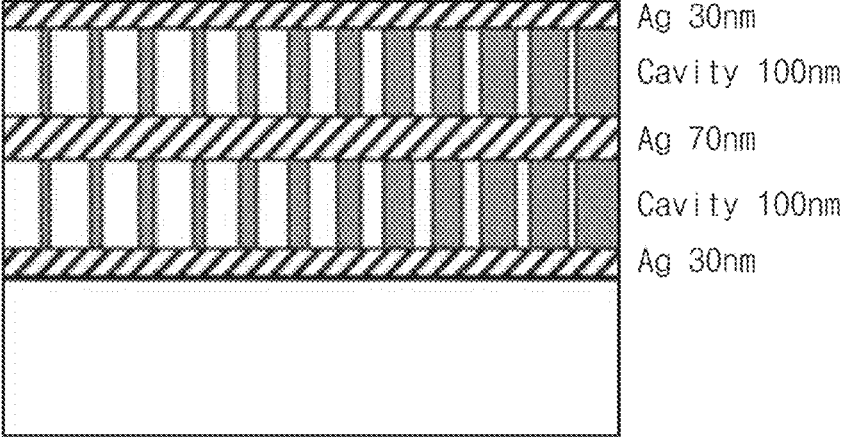
Figure 26:
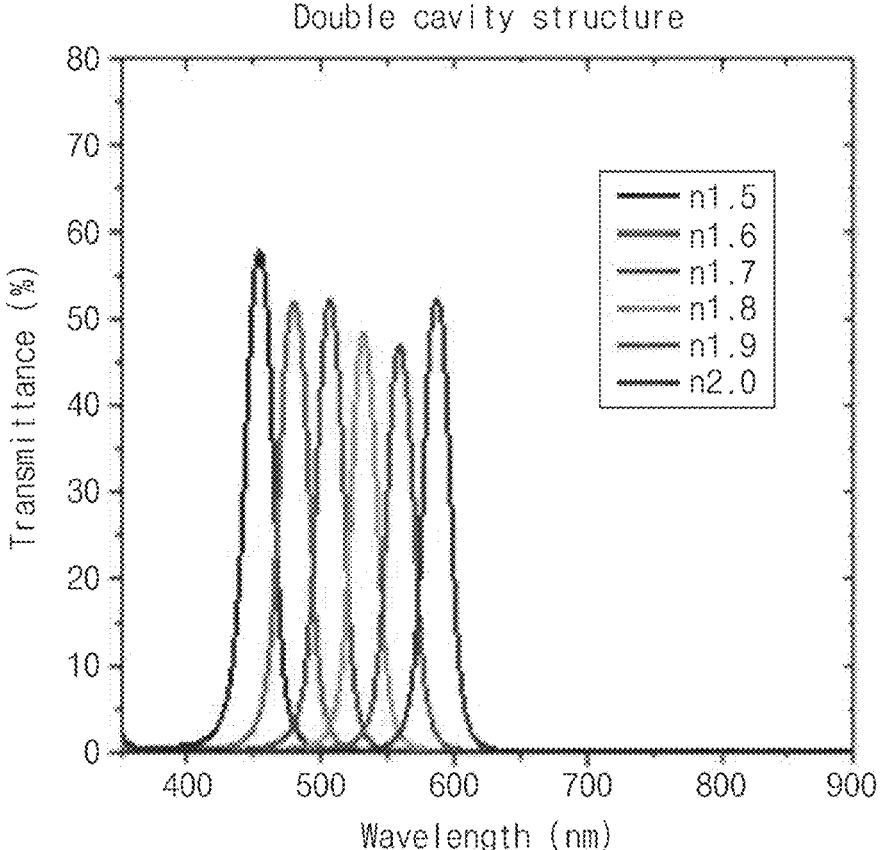

FIGS. 25 and 26 are simulation documents for comparing a single resonance cavity structure and a double resonance cavity structure of the present invention. In the present simulation, the upper and lower reflection layers respectively adopt 30 nm thick Ag layers, and a dielectric cavity is formed to have the thickness of 100 nm. In the double resonance cavity structure, the upper and lower dielectric regions respectively have the thicknesses of 100 nm, and the intermediate reflection layer is formed of a 70 nm thick Ag layer. According to the simulation documents, by introduction of a double cavity structure of a metal-dielectric-metal layer, a line width of the transmission band becomes smaller, band squareness is improved, and an out-of-band rejection property is also improved.

Figure 27:
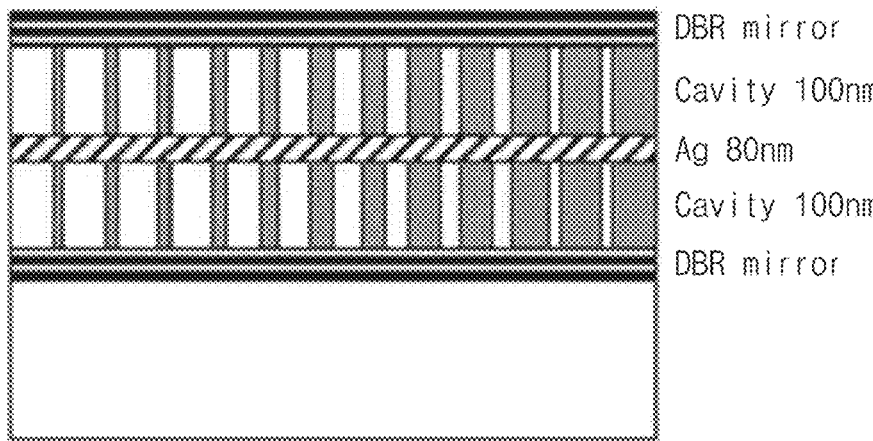
Figure 27:
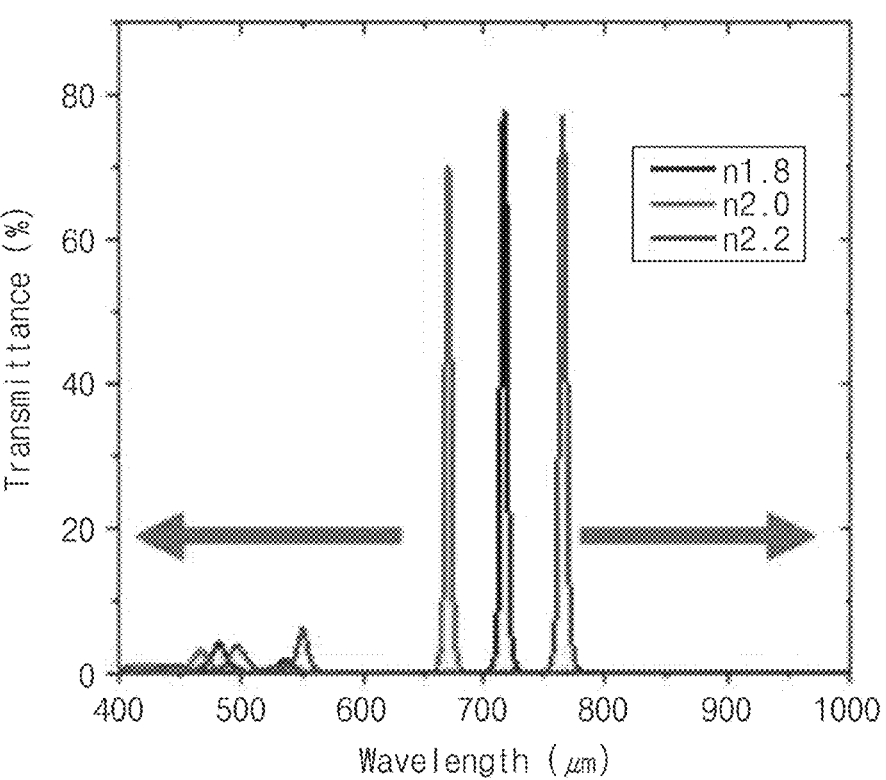

FIG. 27 shows a simulation result of the induced transmittance effect for a structure in which a metal layer is inserted to a middle part of the dielectric region in a Fabry-Perot filter having a DBR. For the induced transmittance effect of a specific band, a dielectric-metal-dielectric layer of a central part, from which upper and lower DBRs are excluded which are composed of a high refractive index layer and a low refractive index layer of a quarter-wave condition, is designed to have the thickness by which optical impedance is matched in order to minimize reflection in a corresponding band.

In FIG. 27, the intermediate reflection layer is formed of 80 nm thick Ag, and both side reflection layers are formed of DBR layers. The dielectric region layer has an upper and lower symmetric structure, and the thickness thereof is determined to be 100 nm. Thereby, the induced transmittance effect is revealed, a very sharp and narrow transmission band may be formed, band squareness is improved, and an excellent out-of-band rejection property may be realized. Therefore, it may be known that the central wavelength of the transmission band is consecutively red-shifted according to a control of refractive indexes of the upper and lower dielectric region layers adjacent to the intermediate layer.

Figure 28:
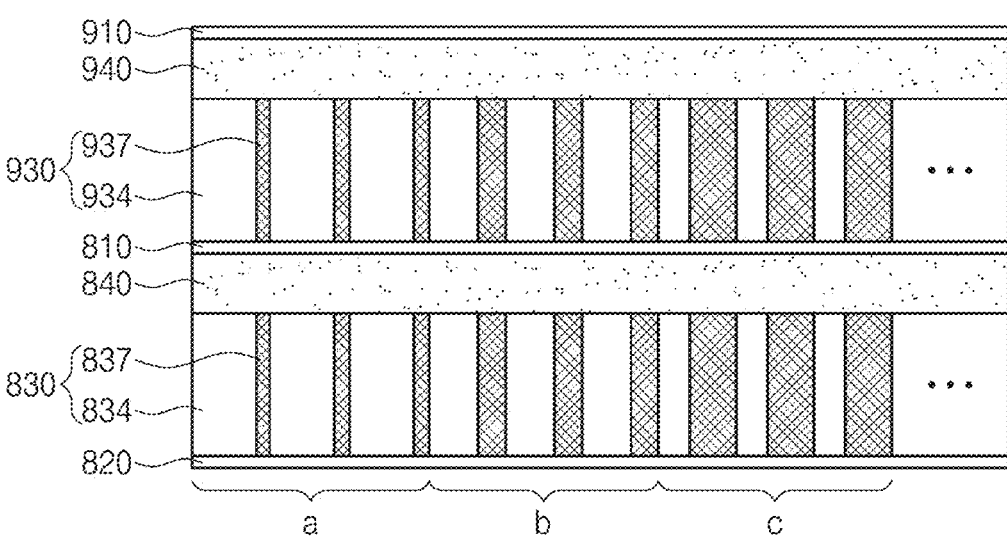
FIG. 28 illustrates a cross-sectional view of other optical filters according to an embodiment of the present invention.

FIG. 28 illustrates a cross-sectional view of other optical filters according to an embodiment of the present invention.

Referring to FIG. 28, an optical filter of FIG. 28 has a structure in which a separate buffer layer is added to the optical filter structure of FIG. 24. Buffer layers 840 and 940 may be added between the reflection layer and the dielectric region. As described above, the buffer layer is effective in moving the wavelength variable range. At this point, it is effective to apply the buffer layer in order to identically maintain an optical thickness (i.e., refractive index multiplied by physical thickness) in each of the upper and lower structures, as shown in FIG. 16. When the optical thickness is identical, similar to FIG. 16, the buffer layer may be identically disposed in an upper stage of the upper and lower dielectric region layers, or on the contrary, in a lower stage of the upper and lower dielectric region layers. In addition, it is possible to dispose the buffer layer to be mirror-symmetric with the intermediate reflection layer 810 at the center. For example, the buffer layer may be possibly disposed between the intermediate reflection layer 810 and the dielectric region 930 in the upper structure and/or between the dielectric region 830 and the reflection layer 820 in the lower structure. In addition, the buffer layers may be disposed in an upper part and lower part of the dielectric regions of the upper and lower structures.

Figure 29:
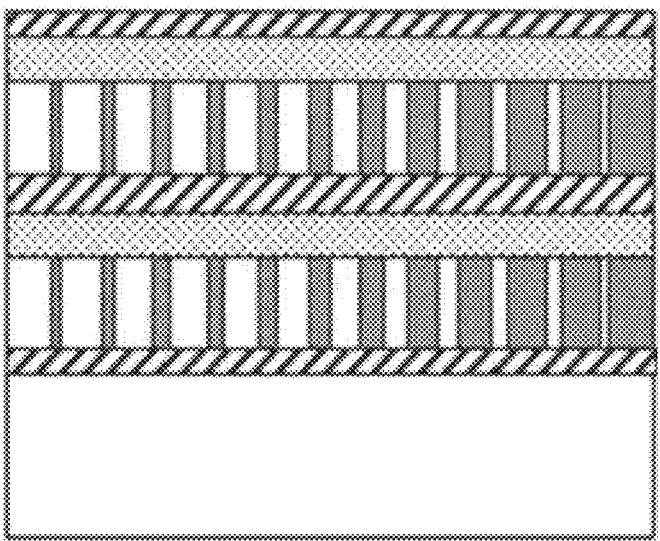
FIGS. 29 and 30 are simulation documents for comparing a structure in which a buffer is added to a double resonance cavity structure of the present invention.
Figure 29:
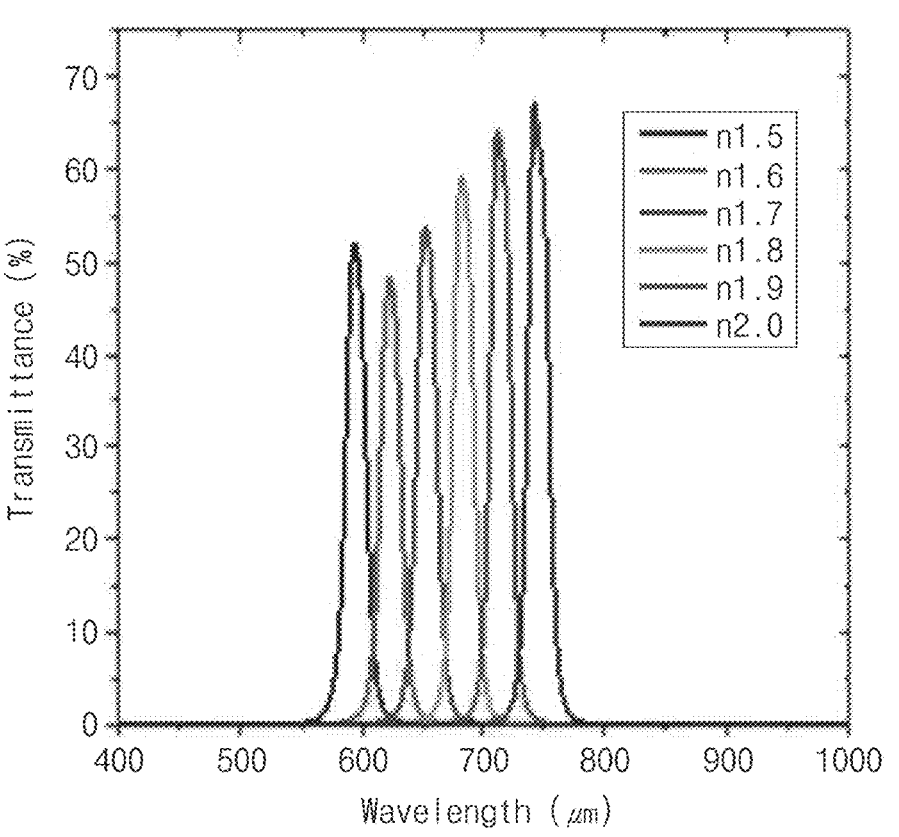
Figure 30:
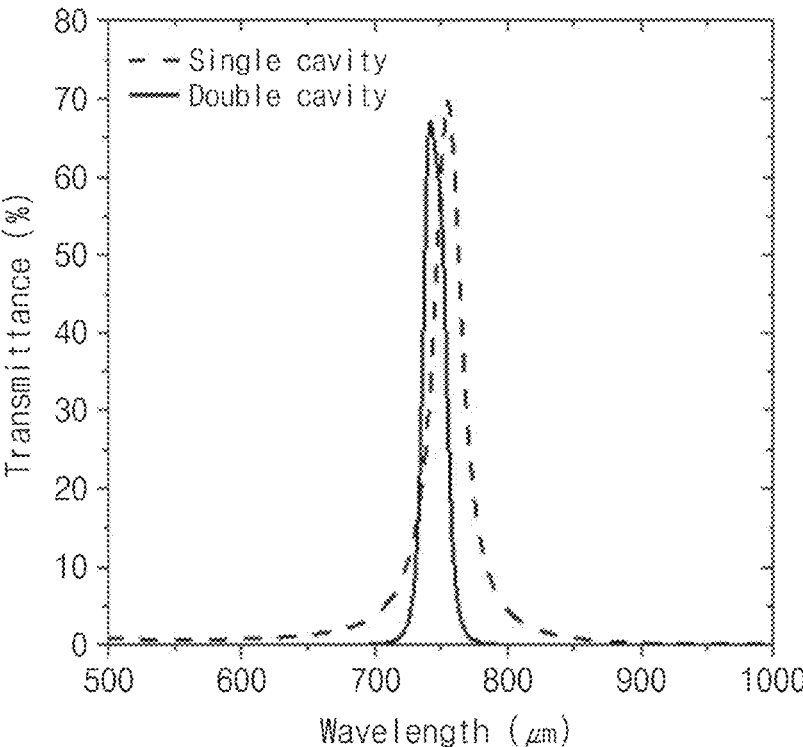

FIGS. 29 and 30 are simulation documents for comparing a structure in which a buffer layer is added to a double resonance cavity structure that adopts the upper and lower metal reflective layers of the present invention. FIG. 29 shows a transmission band spectrum when dielectric buffer layers having a refractive index of 1.5 and the thickness of 50 nm are respectively inserted to the upper parts of the upper and lower dielectric regions in the structure of FIG. 26. It may be known that due to interposition of the buffer layer, the central wavelength of the transmission band entirely moves to a long wavelength region. In addition, as the refractive index of the dielectric layer increases from 1.5 to 2.0, the central wavelength of the transmission band is also consecutively red-shifted.

FIG. 30 shows a simulation result in which transmission spectrum shapes are compared for a single resonance cavity structure with the buffer layer inserted thereto and a double resonance cavity structure. The insertion of the buffer layer has an effect of moving the central wavelength of the transmission band, and similarly to the case without the buffer layer, a FWHM is largely narrowed and squareness is improved.

Figure 31:
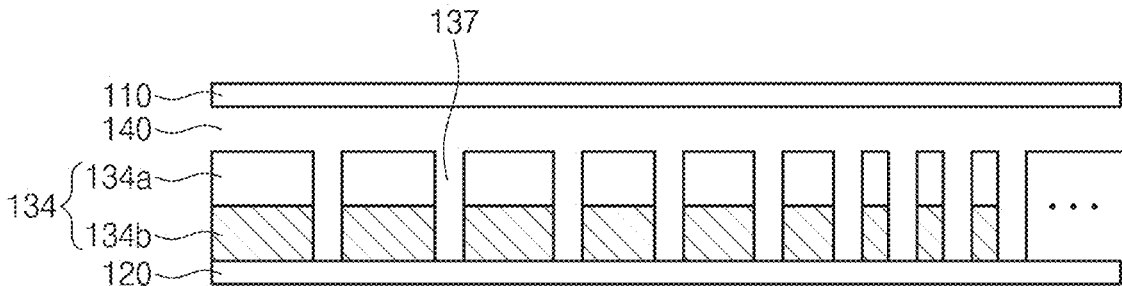
FIG. 31 illustrates a cross-sectional view of other optical filters according to an embodiment of the present invention.

FIG. 31 illustrates a cross-sectional view of other optical filters according to an embodiment of the present invention.

When mainly describing a difference with FIG. 1, in relation to FIG. 1, the case where a material forming the dielectric region 130 is formed of two 134 and 137 has been described, but in FIG. 18, the material is formed by three or more. In FIG. 18, as one case of them, the first material 134 is formed of two materials 134a and 134b vertically laminated. In actual manufacturing, two materials 134a and 134b are consecutively deposited on the reflection layer 120 and in a subsequent process, the two layers are selectively etched, or are consecutively deposited on a photoresist pore structure formed through prepatterning and then a lift-off process is conducted. In this way, when three or more dielectric regions are formed, it is effective in that more flexible control for an operation wavelength is possible. A wavelength of a light passing the optical filter 100 of the present invention is controlled by the optical thickness of the dielectric region layer formed of the first and second materials 134 and 137. At this point, an effective refractive index responsible for a variable control of the optical thickness of the dielectric region layer is determined by geometrical distributions and relative volume fractions between the first and second materials 134 and 137. Here, when the first material is formed of materials of different refractive indexes, a control range of an effective refractive index may be enlarged and consequently, the control of the optical thickness of the dielectric region layer becomes further convenient.

On the other hand, FIG. 31 illustrates a case where the first material 134 is configured from two vertically laminated materials 134a and 134b, but it is also possible that the first material 134 is vertically laminated with at least two layers or is horizontally composed of two or more materials. But in a case where multiple layers are formed, a pattern may be finer at the time of forming a nanopattern. Therefore, it may be effective that such a limitation is minimized.

In addition, for the second material 137, it is possible to vertically laminate two or more layers, or to be horizontally formed of two or more materials.

Figure 32:
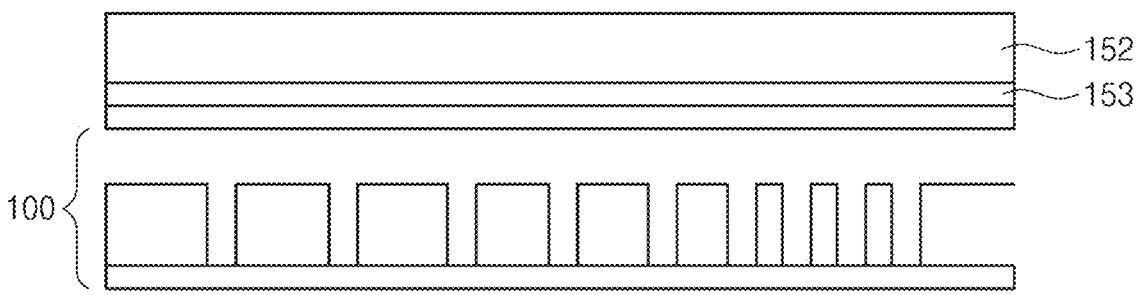
FIG. 32 illustrates a cross-sectional view of other optical filters according to an embodiment of the present invention.

FIG. 32 illustrates a cross-sectional view of other optical filters according to an embodiment of the present invention.

The optical filter of the present invention may include an anti-reflection coating layer 153 and/or a broadband transmission band filter 152. In addition, although not illustrated in FIG. 19, it is also possible to additionally dispose an adhesion layer or a diffusion barrier layer between the first and second reflection layers 110 and 120, and the first and second materials 134 and 137.

The anti-reflection coating layer 153 is a component adoptable for reducing an amount of a light that is incident to the optical filter from the outside and then is reflected to disappear to the outside. The broadband transmission band filter 152 is an effective component capable of adjusting a necessary wavelength band of a light incident to the optical filter.

On the other hand, the anti-reflection coating layer may be formed on a surface other than a surface on which the optical filter is formed on a separate transparent substrate on which the optical filter of the present invention is formed.

Figure 33:
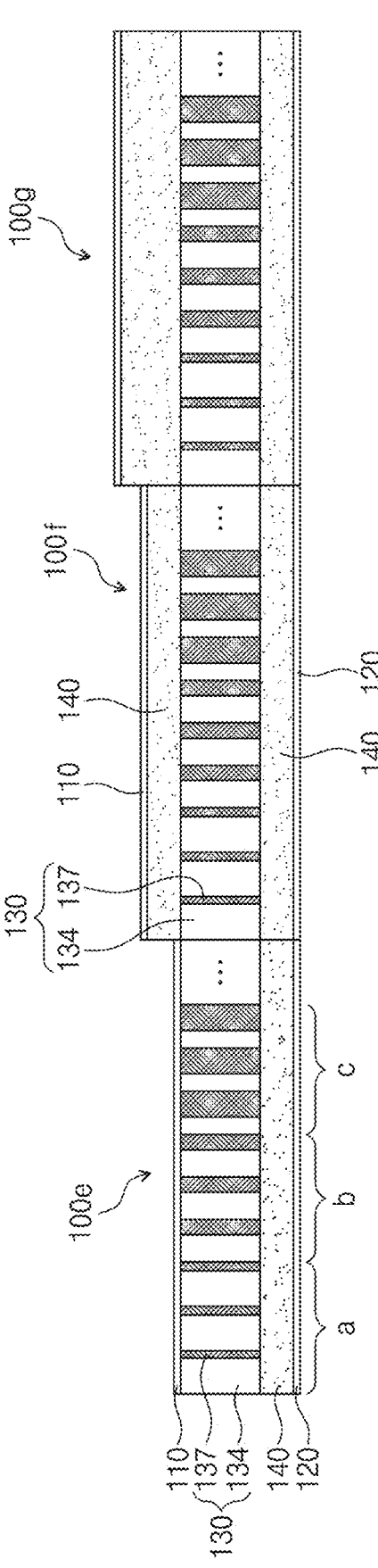
FIG. 33 is a cross-section view of another optical filter according to an embodiment of the present invention.

FIG. 33 is a cross-section view of another optical filter according to an embodiment of the present invention.

FIG. 33 illustrates an example that three optical filter regions 100e, 100f, and 100g are combined, wherein the optical filter region 100e has a type that the buffer layer 140 is disposed in a lower part of the dielectric region 130, the optical filter region 100f has a type that the buffer layers 140 are respectively disposed in an upper and lower parts of the dielectric region 130, and the optical filter region 100g has a type that like the optical filter region 100f, the buffer layers 140 are respectively disposed in the upper and lower parts, and a part of the buffer layers 140 may be formed to have difference in thickness. Here, it also possible to have only difference in thickness of the upper buffer layer without the lower buffer layer 140. In FIG. 20, a, b, and c regions, in which different wavelength regions of the optical filter region 100e are filtered, are illustrated to have the buffer layers 140 in a lower part of the dielectric region 130, but the a, b and c regions also have different buffer layers like the optical filter regions 110*e*, 100*f*, and 100*g*.

According to configuration of FIG. 33, it is possible to overcome a limitation in variable wavelength band coverable by an individual optical filter region, enlarge an entire operation wavelength range of the present optical filter, and make wavelength adjustment easy.

Figure 34:
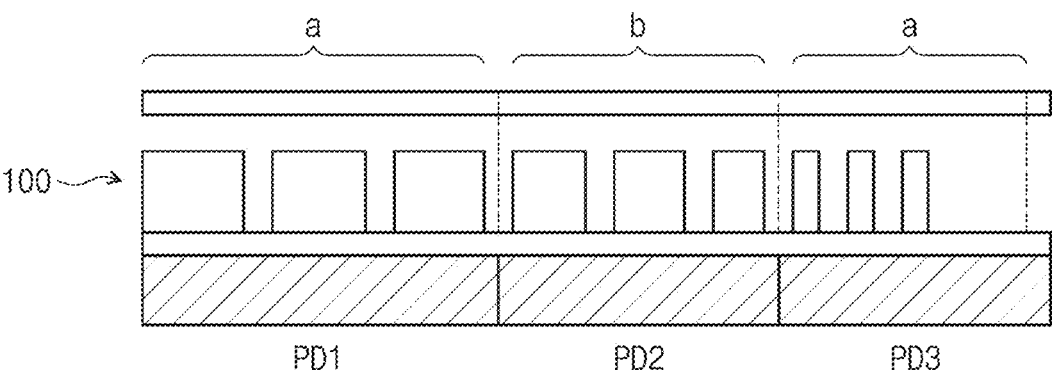
FIG. 34 illustrates an example of an optical device according to an embodiment of the present invention.

FIG. 34 illustrates an example of an optical device according to an embodiment of the present invention.

The present optical device is provided with filter regions a, b and c, and photodetectors PD1, PD2, and PD3 respectively corresponding thereto. Although FIG. 34 illustrates a type that a structure such as a transmissive substrate is not inserted between the filter regions a, b, and c, and the photodetectors PD1, Pd2, and PD3, the structure such as the transmission substrate may be formed. Each of the photodetectors performs a function of detecting a light corresponding to a wavelength band from each light transmission region, and performs a well-known function such as conversion of an amount of a light detected through various electric circuit units and electrodes, etc., to an electrical signal.

Hereinafter, another optical device according to an embodiment of the present invention will be described. The optical filter of the present invention may be formed on the top surface of the transmissive substrate to be manufactured as a separate optical filter module (see FIG. 7). Any material only to be transparent at an operation wavelength may be used as the transmissive substrate, and a glass or a polymer may be used. Such an optical filter module may be manufactured in a type to which an optical detector is not integrated. Therefore, in actual use, the optical detector may be attached or when manufacturing a complete product, an optical filter module may be attached to the optical detector. In the case where the optical filter module is actually attached to the optical filter and used, it is also possible, for example, to couple the optical filter module to the front of a camera lens.

Figure 35:
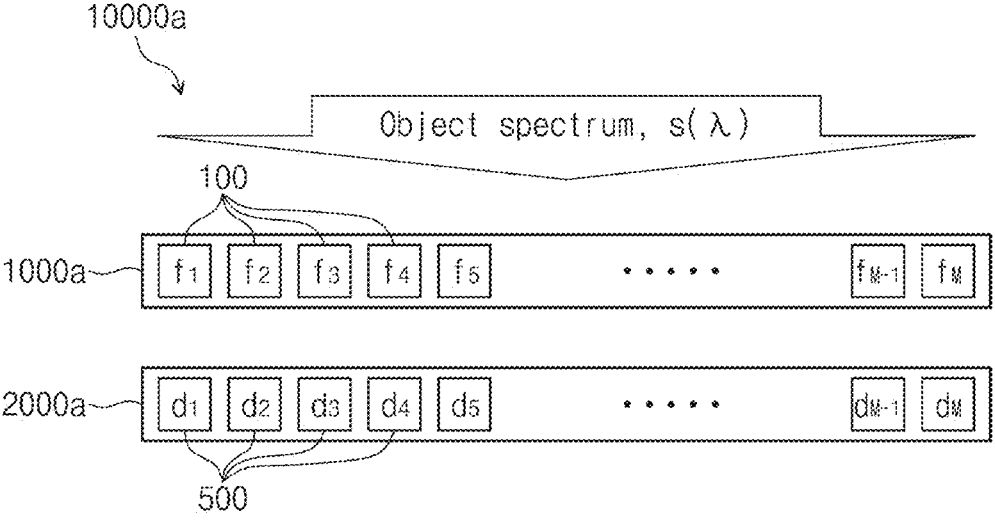
FIG. 35 is a conceptual diagram of a one-dimensional spectroscope according to an embodiment of the present invention.

FIG. 35 is a conceptual diagram of a one-dimensional spectroscope according to an embodiment of the present invention.

FIG. 35 illustrates an example that a spectroscopic device 10000*a* is configured through one-dimensional linear array coupling between a filter array 1000*a* and a photodetector 2000*a*. In a schematic diagram, the spectroscopic device 10000*a* is illustrated which includes the filter array 1000*a* composed of M filter regions 100 and M photodetecting units 500. A period of each optical filter may be determined to be matched with a period of the photo-detecting unit 500 of the coupled one-dimensional linear array photodetector, or matched to the size of a group of a plurality of photo-detecting unit 500. In other words, coupling between the filter and pixels of the photodetector may be one-to-one or one-to-multiple.

An array photodetector coupled to the filter array operates as a spectroscopic device through a mathematical digital signal processing algorithm. When assuming an ideal filter having a delta function property, the resolution simply becomes equal to a value obtained by dividing an operation wavelength region of the spectroscopic device by the number of filters. Accordingly, there is a limitation in that the number of filters required for an high resolution operation increases proportionally thereto.

The optical filter according to the present invention is a non-ideal filter defined by a Lorentzian function, and has a property that an FWHM of a transmission band is determined according to a design of a lower reflection layer. A case of using a metal reflection layer is more typical than a case of using a DBR, and as reflectance of the metal reflection layer is lower or as the period number of unit combination of a low refractive index layer and a high refractive index layer that configure the DBR is smaller, the FWHM increases.

A signal recovery principle in a spectrometer based on the non-identical filter array may be explained using FIG. 35. When a spectrum of an object to be analyzed is s($\lambda$), a transmission function of an individual filter is $f_i(\lambda)$, and a sensitivity function of a photodetector is $d_i(\lambda)$, a detection signal $r_i$ generated when an object spectrum passes the filter and reaches the photodetector is represented as the following Equation (1), and is deployable in a matrix equation of Equation (2), when represented by a discrete model.

$$r_i = \int_\lambda f_i(\lambda_i) d_i(\lambda_i) s_i(\lambda_i) d\lambda_i = \int_\lambda D_i(\lambda_i) s_i(\lambda_i) d\lambda_i \tag{1}$$

$$\begin{bmatrix} r_1 \\ \vdots \\ r_i \\ \vdots \\ r_M \end{bmatrix} = \begin{bmatrix} D_1(\lambda_1) & \cdots & D_1(\lambda_N) \\ \vdots & \vdots & \vdots \\ D_i(\lambda_1) & \cdots & D_i(\lambda_N) \\ \vdots & \vdots & \vdots \\ D_M(\lambda_1) & \cdots & D_{Mi}(\lambda_N) \end{bmatrix} \begin{bmatrix} s(\lambda_1) \\ s(\lambda_2) \\ \vdots \\ \vdots \\ s(\lambda_N) \end{bmatrix} + \begin{bmatrix} n_1 \\ n_2 \\ \vdots \\ \vdots \\ n_M \end{bmatrix} \tag{2}$$

Since the number M of filters is typically smaller than the number N of wavelength samplings, the linear algebra equation of Equation (2) comes down to an ill-posed problem. Since an explicit inverse matrix of D($\lambda$) having the size of M×N (M<N) does not exist, a spectrum signal may be recovered using a pseudo inverse matrix, but is vulnerable to a small fluctuation or system noise and shows an unstable result.

As a measure for obtaining a more effective and numerically stable solution, a regularization scheme is being used. The most representative scheme may be a Tikhonov regularization scheme. This scheme recovers a spectrum of an analysis target object by determining a solution to minimize a sum of a residual norm and a side constraint norm as Equation (3). Here, $\alpha$ is a regularization factor for determining a weight for minimization of the residual norm in contrast to minimization of the side constraint norm, and there exists an optimal value of $\alpha$ so as to obtain a robust solution. When using singular value decomposition (SVD) and L-curve analysis, the method adapts to a system and determines an optical regularization factor for itself to enable spectrum recovery in real time.

$$s_\alpha = arg \min\{|Ds-r\|_2^2 + \alpha^2 \|L(s-s^*)\|_2^2\} \tag{3}$$

When using such a regulation scheme, it is advantageous in that a spectrum may be recovered with a relatively high resolution, while a non-identical filter array having a wide FWHM is used. A signal recovery algorithm is not limited to the exemplified regularization scheme, but various schemes may be available.

Figure 36:
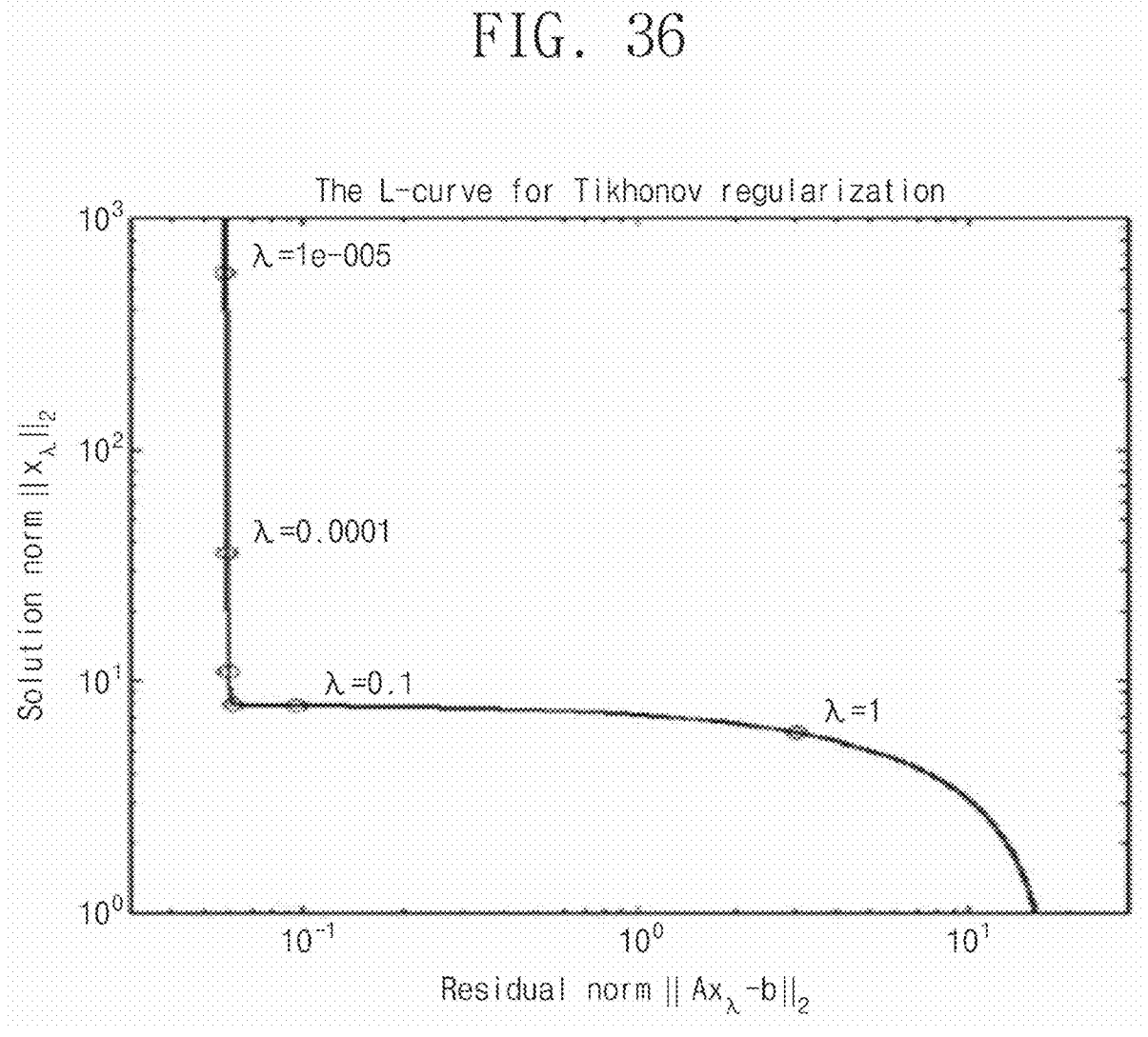
FIG. 36 illustrated a calculation example of an L-curve analysis method for determining an optimal a value in an L-curve analysis method.

On the other hand, the L-curve analysis is a method in which a solution of a Tikhonov regularization equation is obtained when a value is gradually increased and substituted, the obtained solution is substituted again to the residual norm $\|Ds-r\|_2^2$ and solution norm $\|L(s-s^*)\|_2^2$, and resultant values are represented on log-scaled coordinate axes. Then an L-curve shaped graph is obtained and a corner value of the L-curve is adopted as an optimal value $\alpha$. A scheme for obtaining the corner value is to take log-scaled values of the residual norm and solution norm as variables and to determine α having the smallest radius of curvature. The value obtained in this way is substituted again to the Tikhonov regularization to obtain $S_a$ and recover the object's spectrum. FIG. 36 illustrates an example of calculating the L-curve analysis performed to determine an optimal α using the L-curve analysis, and FIG. 23*b* illustrates a L-curve (left) and a curvature of the L-curve function (right). A corner value is determined as α value (here, λ) having the maximum curvature.

Next, for a presence of a system noise, there is a case where a digital signal recovery process by regularization does not properly operate and an unstable solution is output. In order to reduce such a problem, a per-unit cell strength distribution curve of a photodetector, in which a filter array is integrated, is applied to a Savitzky-Golay smoothing algorithm that is effective in noise filtering, and then an influence to signal recovery may be evaluated. A Savitzky-Golay filter is one of smoothing schemes for making waveforms of a data sequence including noises to smooth waveforms from which the noises are excluded while original signal disposition is not largely damaged, and is a filter for obtaining k-th order polynomials for fitting surrounding points best at an individual point by a least square method, and determining a data value at that point. The Savitzky-Golay filter relatively well conserves a maximum, minimum, or peak/valley value by applying a moving average in a scheme that data near a data disposition is more weighted and distant data is less weighted. There occurs a situation where when a noise is mixed in a per-unit cell strength distribution curve that is measured from a photodetector array, even when a Tikhonov regularization scheme is applied, an original spectrum may not be properly recovered. But when the Savitzky-Golay filter is applied, it has been checked that signal recovery performance by digital-signal-processing is excessively improved. FIG. 23*c* shows graphs of an application of the Savitzky-Golay filter for reducing a system noise in a filter system, and a calculation result showing improvement in signal recovery performance according thereto.

On the other hand, the inventors of the present invention find a fact that for spectrum recovery, an error ratio may be reduced when a transmission spectrum of each filter, namely, filter functions form a proper overlap. A description thereabout will be provided.

Figure 37:
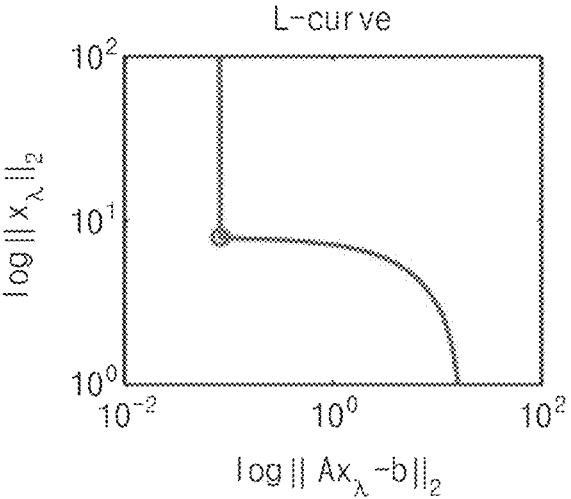
FIG. 37 illustrates an L-curve (left) and a curvature (right) of an L-curve function.
Figure 37:
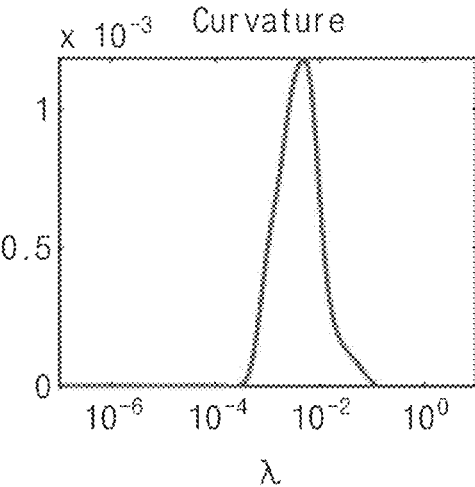
Figure 38:
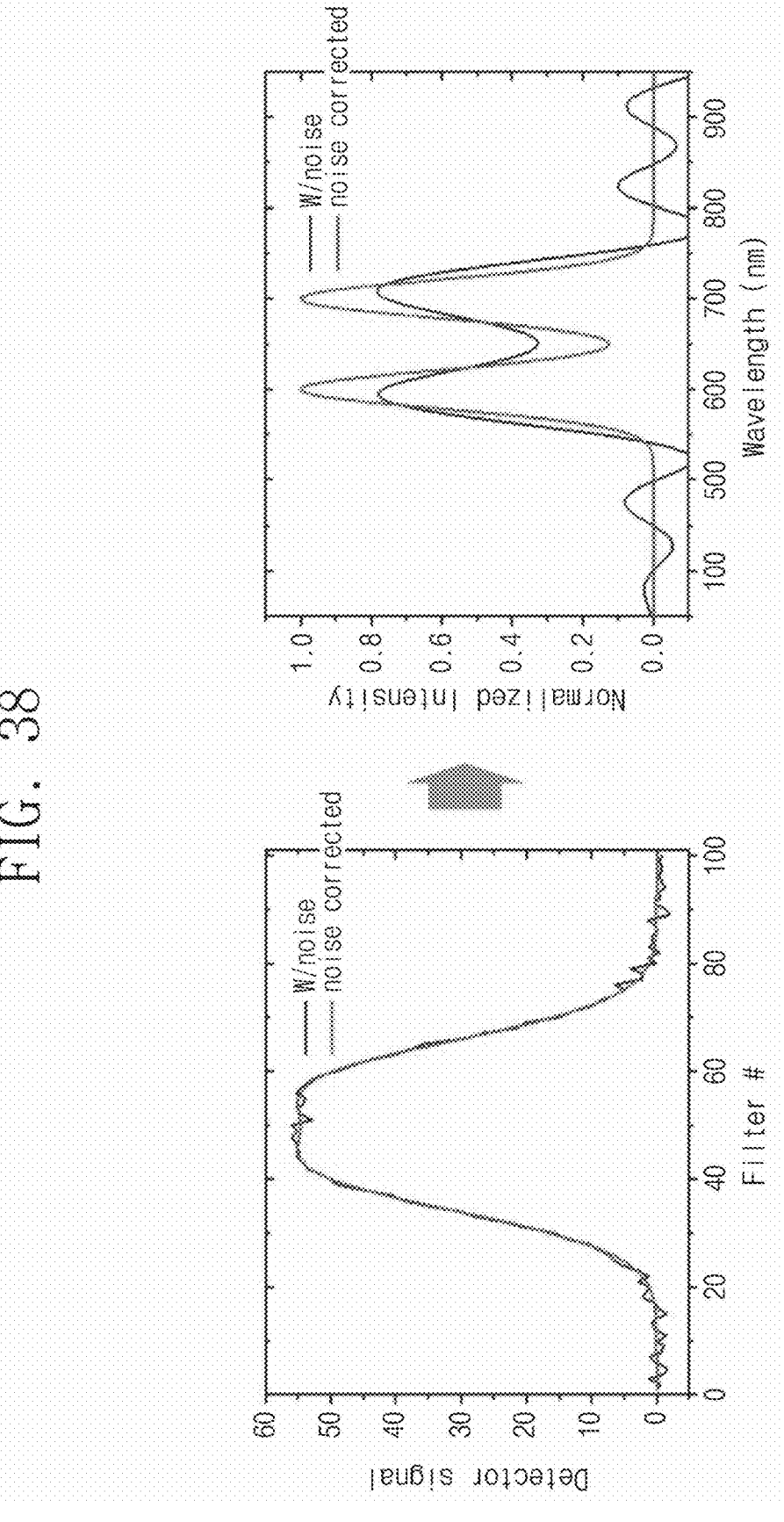
FIG. 38 is graphs showing calculation results showing an Savitzky-Golay filter application for reducing a system noise in a filter system and a signal recovery performance according thereto.
Figure 40:
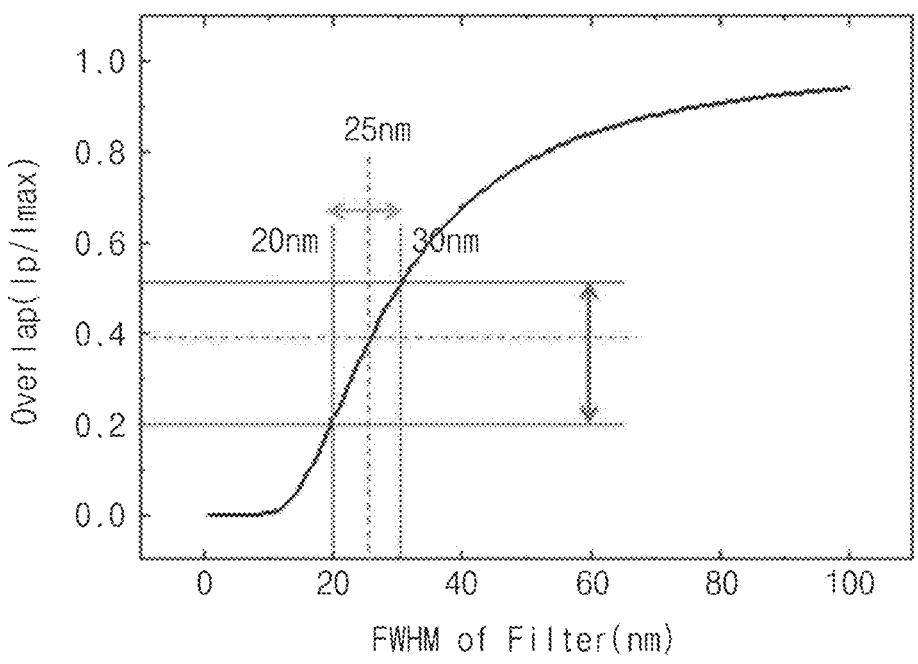
FIG. 40 shows a graph of simulation in which an overlap function is calculated according to a full width at half maximum (FWHM) of a filter function.
Figure 41:
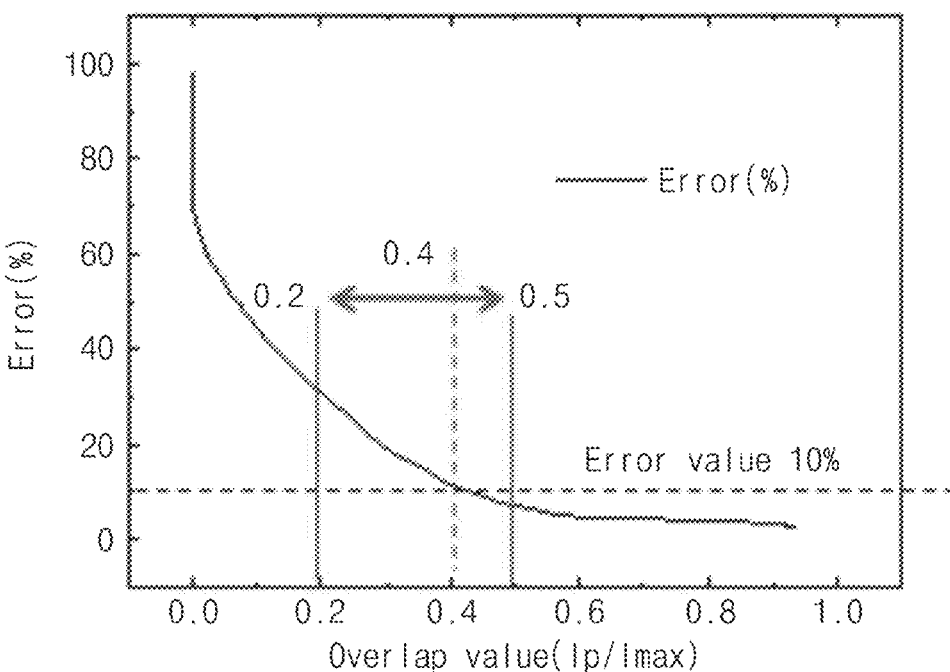
FIG. 41 is a graph of simulation in which an error value (%) according to an overlap of the filter function is calculated in a spectroscope according to an embodiment of the present invention.

FIG. 37 is a conceptual diagram illustrating an overlap situation of a filter function of each filter in spectroscope according to an embodiment of the present invention, FIG. 40 is a graph showing that in a spectroscope according to an embodiment of the present invention, under assumption of a Gaussian function as a filter function, an overlap factor according to an FWHM thereof is calculated, and FIG. 41 is a simulation graph showing that in a spectroscope according to an embodiment of the present invention, a signal recovery error value (%) according to an overlap of filter functions is calculated.

For quantitative finding, the overlap factor is defined as a value obtained by dividing a transmissivity or reflectance value at a point, at which spectrums of two adjacent filter functions cross each other, by a maximum transmissivity or reflectance value of the filter functions, and a variation in signal recovery error value according thereto is evaluated. It may be known that when an overlap degree of the two adjacent filters is lowered to a certain value or lower, the signal recovery error value largely increases.

Figure 42:
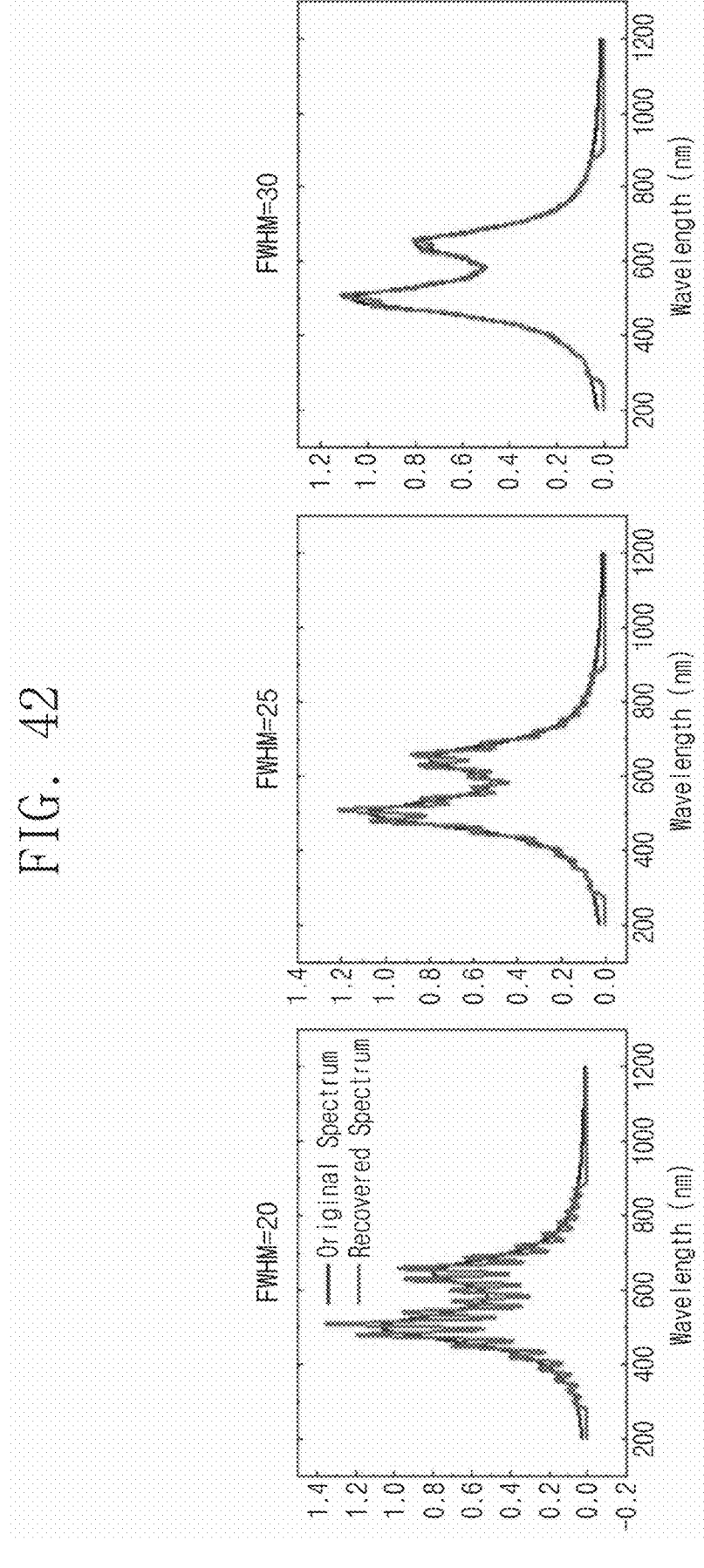
FIG. 42 illustrates an ORIGINAL signal and a RECOVERED signal for each wavelength according to an FWHM in a spectroscope according to an embodiment of the present invention.

FIG. 42 illustrates an object spectrum according to an FWHM of a filter function and a spectrum recovered through digital signal processing, when it is assumed that a Gaussian filter is used in a spectroscope according to an embodiment of the present invention. In this case, the graph shows an exemplary result that a degree of spectrum recovery is improved, when the overlap factor is increased while the FWHM of the filter is changed from 20 nm to 30 nm in a state where a distance between filter central wavelengths is fixed to 30 nm.

Figure 39:
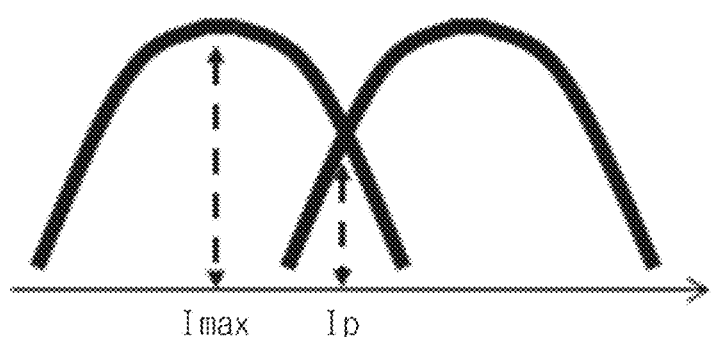
FIG. 39 is a conceptual diagram illustrating an overlap situation of a filter function of each filter in a spectroscope.

For parameters for simulations of FIGS. 40 and 41, the number of filters is 20, an interval between the filters is 30 nm, the FWHM of original spectrum is 100 nm, a Peak-to-Peak value is 150 nm. In addition, the overlap value is changed while increasing the FWHM (1 nm to 100 nm, pitch of 1 nm) of the filter function. The overlap value is defined as Ip/Imax. Imax denotes a maximum intensity of the filter function, and Ip defines the strength of the filter function at a point at which two filter functions cross each other (see FIG. 39). The error value ERROR is defined as the following Equation, where norm( ) denotes a function related to a magnitude of a vector in linear algebra.

$$\text{ERROR}=100*(\text{norm}(\text{recovered signal}-\text{Original Signal})/\text{norm}(\text{Original signal})$$

Referring to FIGS. 40 and 41, when the error value is 10%, it may be checked that the overlap value is about 0.4. At this point, the FWHM is about 25 nm. Referring to FIG. 25, it may be checked that the error value is sharply changed around ±5 nm from a point at which the FWHM is 25 nm.

On the other hand, a description will be provided about a proper overlap range in realization of a spectrum of the present spectroscope. As checked in FIGS. 40 and 41, the smaller the error value, the better. According to FIG. 41, as the overlap increases to reach about 1.0, the error value approaches 0. However, excessively many filter functions may be required to cover a certain wavelength band, since the overlap is excessively large but an interval between filter functions becomes smaller.

Therefore, a preferred lower limit value of the overlap will be discussed. A range of the error value may be preferably smaller than about 30%, and more preferably, smaller than 10%. Accordingly, when it is converted based on the overlap, a preferable overlap is 0.2 or greater and a more preferable overlap is 0.4 or greater. Next, a preferred upper limit value will be discussed. The overlap is preferred to be as high as possible, when a spectrum of adjacent filters exceeds a noise signal level, is not overlapped and is distinguishable. At this point, the number of filters may excessively increase, a structural factor difference between adjacent filters is minute, and thus there may be a process limit. Accordingly, it is preferred that the structural factor difference between adjacent filters is not set to 1 nm or smaller, and there may be an overlap upper limit according thereto.

On the other hand, when filter functions of filters form proper overlaps, an error ratio may be reduced. This aspect may be variously applied without being limited to shapes or kinds of the filters. For example, it may be applied to FIG. 1 or other embodiments of the present invention, and is also applicable to a typically known plasmonic filter, etc. In other words, it is related to a technology for reducing an error ratio and securing the proper number of filters, when overlaps of filters are in a certain range and when filters of each wavelength band are introduced and the filter are integrated to analyze a wider band spectrum.

Figure 43:
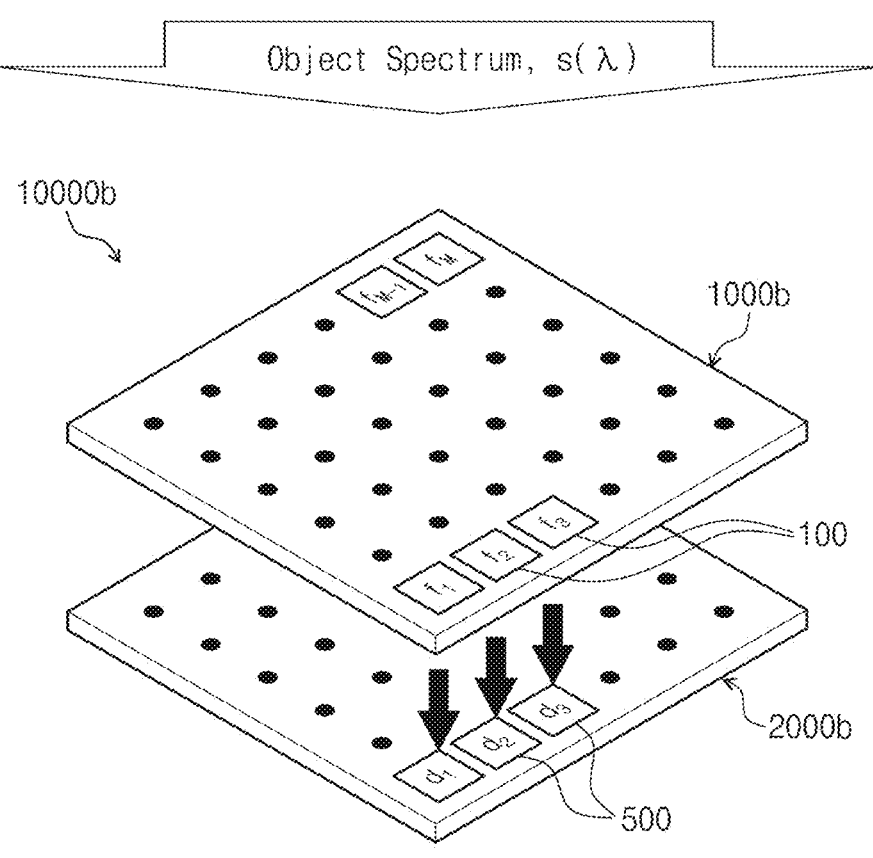
FIG. 43 is a conceptual diagram of a two-dimensional spectroscope according to an embodiment of the present invention.

FIG. 43 is a conceptual diagram of a two-dimensional spectroscope of the present invention. An example of a spectroscope 10000*b* is illustrated which is configured through a combination in which a filter array 1000$b$ and a photodetector 2000$b$ are arranged in two-dimension. In comparison to the spectroscope 10000$a$ of one-dimensional combination, it is advantageous in integration, and advantageous in combination with an existing CMOS image sensor, etc. The spectroscopes 10000$a$ and 10000$b$ enable a light to pass and intensity information is enabled to be output from a light in a specific wavelength band of which a central wavelength is slightly moved for each position in one direction of a filter.

Accordingly, the spectroscopes operate as a spectrometer that enables conversion to a strength distribution according to a light wavelength, and a spectroscope based on a filter array may be realized.

Figure 44:
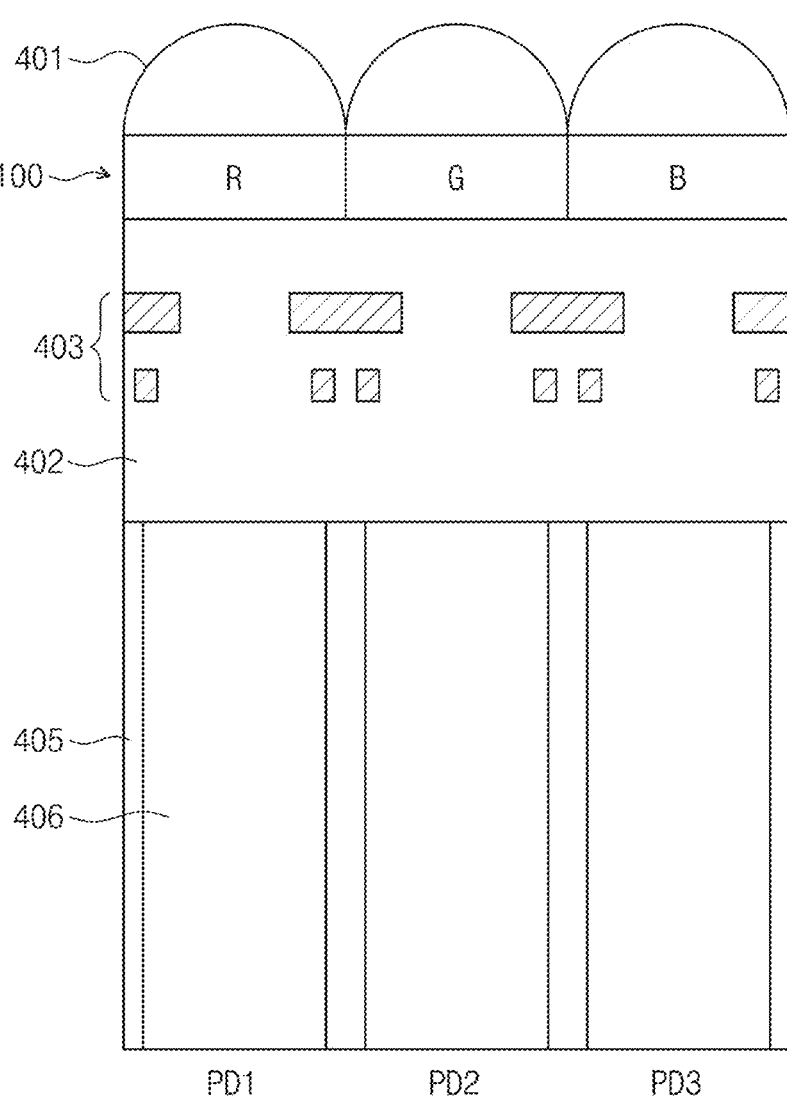
FIGS. 44 and 45 are conceptual diagrams of image sensors according to an embodiment of the present invention.
Figure 45:
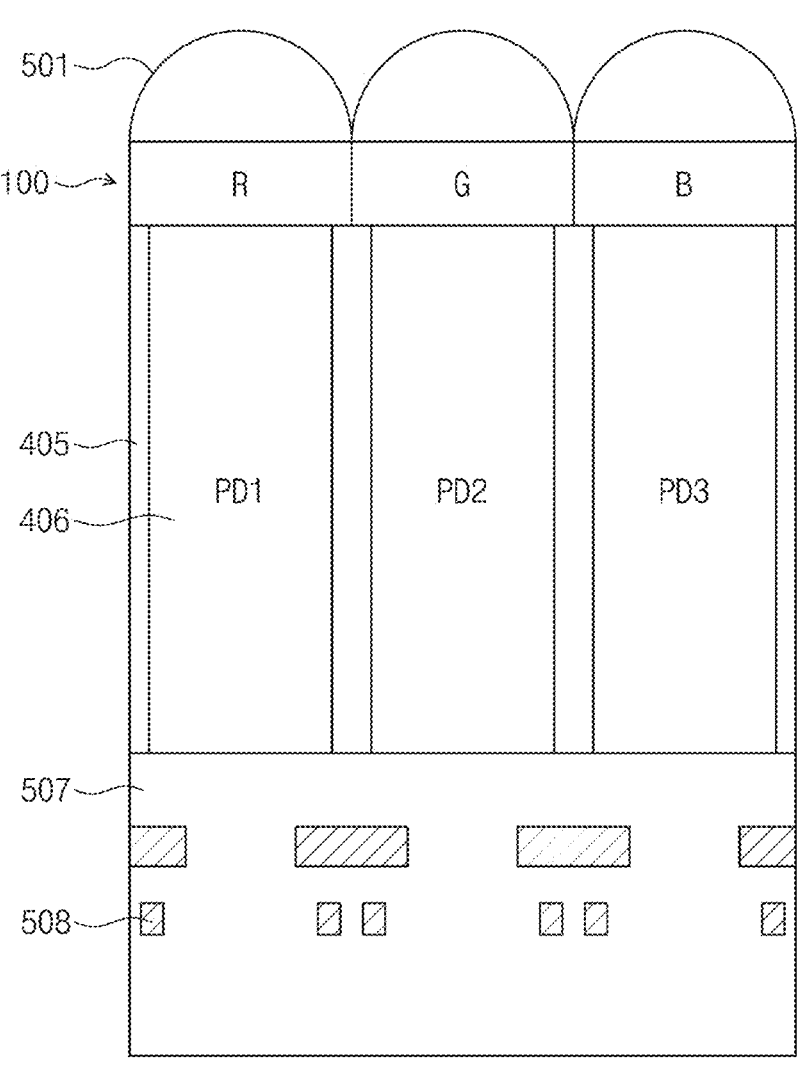

FIGS. 44 and 45 are conceptual diagrams of image sensors according to an embodiment of the present invention. FIGS. 44 and 45 respectively correspond to CMOS image sensor manufacturing structures in an FIS scheme and BIS scheme. In these image sensor structures, color filters such as R, G, B are essentially added. The optical filter of the present invention may be applied to R, G, B of the CMOS image sensors.

Referring to FIG. 44, a separation region 405 is interposed between photodetection regions 406, and various electrode lines 403 are formed inside an intermediate dielectric region 402. And thereon, R, G, B filter regions are formed, and thereon, micro-lenses 401 are respectively formed in correspondence to the R, G, B filter regions.

Referring to FIG. 45, various electrode lines 508 are formed inside the dielectric region 507. Thereon, the separation regions 405 exist between the photodetection regions 406. And on the photo detection regions 406, R, G, B filter region is formed and thereon, the micro-lenses 501 are respectively formed in correspondence to the R, G, B filter regions.

Figure 46:
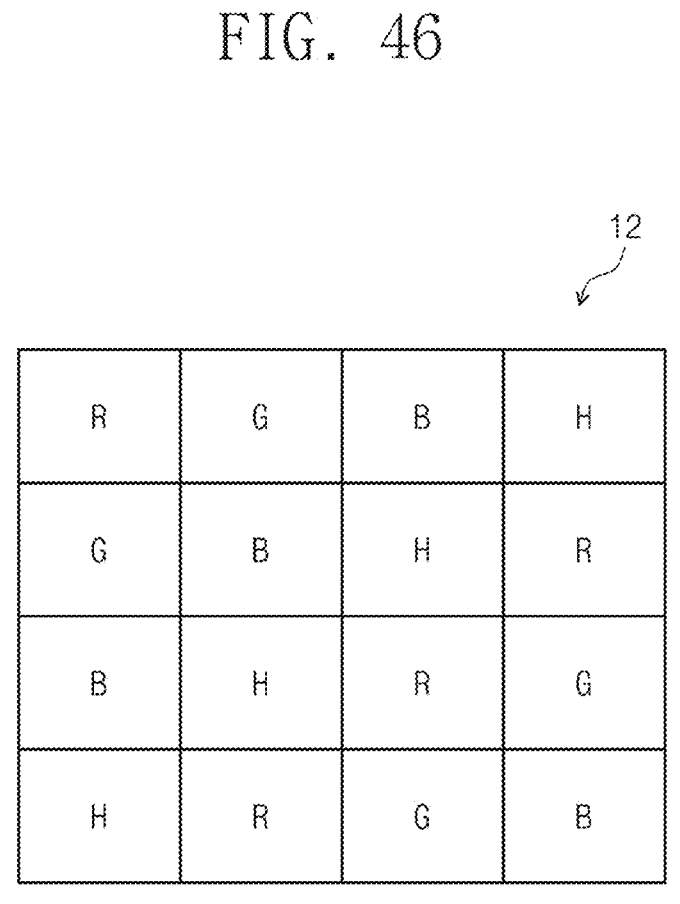

FIG. 46 is a conceptual diagram of a filter array including a hyper-spectral image sensor according to an embodiment of the present invention. FIG. 46 is a drawing for extracting a part of a unit pixel of the CMOS image sensor and a unit pixel of the hyper spectral image sensor.

The hyper spectral image sensor is an element configured to sense several (relatively narrow) wavelength parts or a wavelength band of an entire hyper spectrum emitted from or absorbed by an object.

As illustrated in FIG. 46, according to one embodiment, the hyper spectral image sensor may be used in a type of being coupled to the CMOS sensor. In detail, a region referred to R, G, and B denotes that of color filters configured to filter R, G, B of the CMOS image sensor, and a region referred to H denotes a filter region configured to sense a hyper spectral image. In filter region H, a partially narrow region in the infrared ray region is designated, and in this region, it is possible to secure hyper spectral data different from R, G, B.

An optical filter described above are not limited to the configuration and the method in the embodiment described above, and the embodiment may have a configuration in which all or a part of each embodiment is selectively combined such that various modifications can be made.

The present invention may be carried out in other specific ways than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

The invention claimed is:

1. An optical filter comprising:
a plurality of filter regions,
wherein each of the plurality of filter regions comprises
a first reflection layer and a second reflection layer separated from each other;
a dielectric region interposed between the first reflection layer and the second reflection layer and in which two materials, of which refractive indexes are different, are alternately disposed; and
a buffer layer disposed between the dielectric region and at least one of the first reflection layer and the second reflection layer,
wherein the plurality of filter regions includes, at least, a first filter region and a second filter region adjacent to the first filter region,
wherein the first filter region has a first structure and the second filter region has a second structure different from the first structure,
wherein an overlap value of a pair of the plurality of filter regions is defined as Ip/Imax,
wherein Ip defines a strength of a filter function at a point at which filter functions of the pair of the plurality of filter regions cross each other, and Imax denotes a maximum intensity of the filter function of the pair of the plurality of filter regions,
wherein the first structure and the second structure are configured such that the overlap value of the first filter region and the second filter region is about 0.4 to about 1, and
wherein a full width at half maximum (FWHM) of the filter function of each of the pair of filter regions is 100 nanometers or less.

2. The optical filter of claim 1, wherein a first relative volume ratio of the two materials alternately disposed in the first filter region is different from a second relative volume ratio of the two materials alternately disposed in the second filter region.

3. The optical filter of claim 2, wherein
a first relative width ratio of the two materials in the first filter region is different from a second relative width ratio of the two materials in the second filter region.

4. The optical filter of claim 3, wherein, in the two materials alternately disposed, a pair of two adjacent materials are allowed to respectively have same widths as a pair of two adjacent other materials in one direction.

5. The optical filter of claim 2, wherein the two materials are composed of a first material comprising in plurality and disposed at a pre-determined interval, and a second material surrounding the first material.

6. The optical filter of claim 2, wherein a width of a pair of the two materials is smaller than a wavelength of a light passing through the optical filter.

7. The optical filter of claim 2, wherein the filter regions, in which relative volume ratios of the two materials are different from each other, are in two or more directions in a plane.

8. The optical filter of claim 2, wherein the first reflection layer and the second reflection layer are a metal layer or a dispersion Bragg reflector (DBR).

9. The optical filter of claim 2, wherein the dielectric region comprises three or more materials.

10. The optical filter of claim 2, wherein the buffer layer is formed of a first or second material of the two materials.

11. The optical filter of claim 2, wherein an upper part of the second reflection layer comprises a wideband transmission filter and/or anti-reflection coating.

12. The optical filter of claim 2, wherein the filter regions respectively comprise different buffer layers.

13. The optical filter of claim 2, further comprising an intermediate reflection layer in a central region of the dielectric region, the intermediate reflection layer is parallel to the first reflection layer and the second reflection layer.

14. The optical filter of claim 13, further comprising second buffer layers interposed between the intermediate reflection layer and the first reflection layer and between the intermediate reflection layer and the second reflection layer, the second buffer layers have a same optical thickness as each other.

15. An optical filter comprising:

a first optical filter region and a second optical filter region adjacent to each other, wherein each of the first optical filter region and the second optical filter region comprises a first reflection layer and a second reflection layer separated from each other;

a dielectric region interposed between the first reflection layer and the second reflection layer and in which two materials, of which refractive indexes are different, are alternately disposed, one of the two materials having a first width and another of the two materials having a second width;

a first buffer layer disposed between the dielectric region and the first reflection layer; and a second buffer layer disposed between the dielectric region and the second reflection layer, wherein the first optical filter region comprises a first filter region and a second filter region in which a relative width ratio of the first width and the second width is different from a relative width ratio of the first width and the second width in the first filter region, wherein the second optical filter region comprises a first filter region and a second filter region in which a relative width ratio of the first width and the second width is different from a relative width ratio of the first width and the second width in the first filter region, wherein the second buffer layer of first optical filter region has a thickness greater than a thickness of the second buffer layer of second optical filter region, and wherein a relative volume ratio of the two materials alternately disposed in the first optical filter region and is different from a relative volume ratio of the two materials alternately disposed in the second optical filter region.

16. The optical filter of claim 15, wherein an overlap value of the first filter region and the second filter regions is about 0.4 to about 1, and wherein the overlap value of the first filter region and the second filter region is defined as Ip/Imax, Ip defines a strength of a filter function at a point at which filter functions of the first filter region and the second filter region cross each other, and Imax denotes a maximum intensity of the filter function of the first filter region and the second filter region.

17. The optical filter of claim 15, wherein the first buffer layer of first filter region has a thickness same as a thickness of the first buffer layer of second filter region.

18. An optical device comprising:

an optical detection region including an image sensor region and a spectrum sensor region;

a color filter layer at the image sensor region on the optical detection region, the color filter layer is configured to filter an incident light to at least R, G, and B; and a spectral filter at the spectrum sensor region on the optical detection region, the spectral filter including a plurality of filter regions, wherein the color filter layer and the spectral filter are configured a unit pixel, wherein each of the plurality of filter regions comprises a first reflection layer and a second reflection layer separated from each other;

a dielectric region interposed between the first reflection layer and the second reflection layer and in which two materials, of which refractive indexes are different, are alternately disposed; and a buffer layer disposed between the dielectric region and at least one of the first reflection layer and the second reflection layer, wherein the plurality of filter regions includes, at least, a first filter region and a second filter region adjacent to the first filter region, the first filter region has a first structure and the second filter region has a second structure different from the first structure, wherein an overlap value of a pair of the plurality of filter regions is defined as Ip/Imax, wherein Ip defines a strength of a filter function at a point at which filter functions of the pair of the plurality of filter regions cross each other, and Imax denotes a maximum intensity of the filter function of the pair of the plurality of filter regions, wherein the first structure and the second structure are configured such that the overlap value of the first filter region and the second filter regions is about 0.4 to about 1, and wherein a full width at half maximum (FWHM) of the filter function of each of the first filter region and the second filter region is 100 nanometers or less.

19. The optical device of claim 18, wherein the two materials are alternately disposed, and the plurality of filter regions comprising at least two filter regions in which relative width ratios of the two materials are different.

\* \* \* \* \*